(12) United States Patent
Kannan et al.

(10) Patent No.: US 11,102,530 B2
(45) Date of Patent: Aug. 24, 2021

(54) ADAPTIVE PROCESSING AND CONTENT CONTROL SYSTEM

(71) Applicant: Pluralsight LLC, Farmington, UT (US)

(72) Inventors: Krishna James Kannan, Boston, MA (US); Nathan R. Walkingshaw, Sandy, UT (US); Gilbert Gomez Lee, Draper, UT (US)

(73) Assignee: PLURALSIGHT LLC, Farmington, UT (US)

( * ) Notice: Subject to any disclaimer, the term of this patent is extended or adjusted under 35 U.S.C. 154(b) by 0 days.

(21) Appl. No.: 17/006,524

(22) Filed: Aug. 28, 2020

(65) Prior Publication Data

US 2021/0105518 A1     Apr. 8, 2021

Related U.S. Application Data

(63) Continuation of application No. 17/003,956, filed on Aug. 26, 2020.

(60) Provisional application No. 62/893,038, filed on Aug. 28, 2019, provisional application No. 62/891,824, filed on Aug. 26, 2019.

(51) Int. Cl.
| | |
|---|---|
| *H04N 21/25* | (2011.01) |
| *G06F 16/74* | (2019.01) |
| *H04N 21/21* | (2011.01) |
| *H04N 21/218* | (2011.01) |
| *G06K 9/62* | (2006.01) |
| *H04N 21/2381* | (2011.01) |
| *G06F 16/738* | (2019.01) |

(52) U.S. Cl.
CPC ........ *H04N 21/251* (2013.01); *G06F 16/739* (2019.01); *G06K 9/6219* (2013.01); *G06K 9/6256* (2013.01); *H04N 21/2181* (2013.01); *H04N 21/2381* (2013.01)

(58) Field of Classification Search
CPC ... H04N 21/251; H04N 21/2181; G06F 16/74
USPC .......................................................... 725/53
See application file for complete search history.

(56) References Cited

U.S. PATENT DOCUMENTS

2019/0303403 A1 * 10/2019 More ..................... G06F 16/74

* cited by examiner

*Primary Examiner* — Jeffery A Williams
(74) *Attorney, Agent, or Firm* — Kilpatrick Townsend & Stockton LLP

(57) ABSTRACT

Systems, methods, and non-transitory, machine-readable media to facilitate adaptive processing and content control are disclosed. Content composites may be created and configured according to a computational model that may include a hierarchical ordering of the content composites using a hierarchical data structure. The configured content composites may be presented with a graphical user interface of an endpoint device. Metrics of interactions with interface elements corresponding to the configured content composites may be determined using a processing device that monitors inputs. The computational model may be automatically trained using the metrics of interactions to create an adapted computational model. Adapted content composites may be created and configured according to the adapted computational model that may include a second hierarchical ordering using a second hierarchical data structure. The adapted content composites may be presented with the graphical user interface.

17 Claims, 9 Drawing Sheets

ADAPTIVE PROCESSING AND CONTENT CONTROL SYSTEM

CROSS-REFERENCE

This application claims the benefit of and priority to U.S. Provisional Application No. 62/893,038, filed Aug. 28, 2019, which is incorporated by reference herein in its entirety for all purposes. This application is also a continuation-in-part of U.S. application Ser. No. 17/003,956, filed on Aug. 26, 2020, which claims the benefit of and priority to U.S. Provisional Application No. 62/891,824, filed Aug. 26, 2019, each of which is incorporated by reference herein in its entirety for all purposes.

TECHNICAL FIELD

Disclosed embodiments of the present disclosure relate generally to load handling and in particular to adaptive processing and content control systems.

BACKGROUND

Performance of various processes frequently requires use of specialized resources. Quantities, capacities, and capabilities of resources such as reliability, speed, efficiency, and accuracy may be limited and varied, however, which may limit an extent to which resources may be available for handling of a process with respect to various loads. Such limitations may result in sub-optimal process performance and results.

Therefore, there is a need in the art for improvements that address such limitations and technical challenges. This and others needs are addressed by the present disclosure.

BRIEF SUMMARY

Certain embodiments of the present disclosure relate generally to load handling and, in particular but not by way of limitation, to adaptive processing and content control systems.

In one aspect, a system to facilitate adaptive processing and content control is disclosed. The system may include one or more processing devices and memory communicatively coupled with and readable by the one or more processing devices and having stored therein processor-readable instructions which, when executed by the one or more processing devices, cause the one or more processing devices to perform operations including one or a combination of the following. Content composites may be collected in a data storage. Each content composite may include audio and/or visual content. The collecting may include one or both of receiving one or more content composites via a network interface and creating one or more content composites, and storing the one or more content composites in the data storage. Based at least in part on the content composites, a configured set of content composites may be created and configured according to a computational model that may include a hierarchical ordering of the set of content composites using a hierarchical data structure and to be presented with a graphical user interface. Presentation of at least part of the configured set of content composites with a graphical user interface of an endpoint device may be caused. Metrics of interactions with interface elements corresponding to the at least part of the configured set of content composites surfaced with the graphical user interface may be determined using a processing device that monitors inputs. The computational model may be automatically trained using the metrics of interactions to create an adapted computational model. An adapted set of content composites may be created and configured according to the adapted computational model that may include one or both of a second hierarchical ordering of the adapted set of content composites using a second hierarchical data structure and specifications of one or more content composites that are different from the configured set of content composites. Presentation of at least part of the adapted set of content composites with one or both of the graphical user interface of the endpoint device and a second graphical user interface of a second endpoint device may be caused.

In another aspect, a method for adaptive processing and content control is disclosed. The method may include one or a combination of the following. Content composites may be collected in a data storage. Each content composite may include audio and/or visual content. The collecting may include one or both of receiving one or more content composites via a network interface and creating one or more content composites, and storing the one or more content composites in the data storage. Based at least in part on the content composites, a configured set of content composites may be created and configured according to a computational model that may include a hierarchical ordering of the set of content composites using a hierarchical data structure and to be presented with a graphical user interface. Presentation of at least part of the configured set of content composites with a graphical user interface of an endpoint device may be caused. Metrics of interactions with interface elements corresponding to the at least part of the configured set of content composites surfaced with the graphical user interface may be determined using a processing device that monitors inputs. The computational model may be automatically trained using the metrics of interactions to create an adapted computational model. An adapted set of content composites may be created and configured according to the adapted computational model that may include one or both of a second hierarchical ordering of the adapted set of content composites using a second hierarchical data structure and specifications of one or more content composites that are different from the configured set of content composites. Presentation of at least part of the adapted set of content composites with one or both of the graphical user interface of the endpoint device and a second graphical user interface of a second endpoint device may be caused.

In yet another aspect, one or more machine-readable storage devices for storing machine-executable instructions are disclosed. The machine-executable instructions, when executed by one or more processing devices, cause the one or more processing devices to perform one or a combination of the following operations. Content composites may be collected in a data storage. Each content composite may include audio and/or visual content. The collecting may include one or both of receiving one or more content composites via a network interface and creating one or more content composites, and storing the one or more content composites in the data storage. Based at least in part on the content composites, a configured set of content composites may be created and configured according to a computational model that may include a hierarchical ordering of the set of content composites using a hierarchical data structure and to be presented with a graphical user interface. Presentation of at least part of the configured set of content composites with a graphical user interface of an endpoint device may be caused. Metrics of interactions with interface elements corresponding to the at least part of the configured set of content composites surfaced with the graphical user interface may be determined using a processing device that monitors inputs. The computational model may be automatically trained using the metrics of interactions to create an adapted computational model. An adapted set of content composites may be created and configured according to the adapted computational model that may include one or both of a second hierarchical ordering of the adapted set of content composites using a second hierarchical data structure and specifications of one or more content composites that are different from the configured set of content composites. Presentation of at least part of the adapted set of content composites with one or both of the graphical user interface of the endpoint device and a second graphical user interface of a second endpoint device may be caused.

In various embodiments, one or more baselines may be determined based at least in part on pattern recognition of previous metrics of interactions mapped to the at least part of the configured set of content composites. One or more variances may be determined based at least in part on pattern recognition of the metrics of interactions mapped to the at least part of the configured set of content composite with respect to at least one baseline of normality of the one or more baselines of normality. The adapted set of content composites may be based at least in part on the one or more variances.

In various embodiments, the determining the metrics of interactions may be based at least in part on collecting electronic communications received via a network, processing the data portions to identify indicia of usage of one or more of the content composites, and mapping at least the subset of the indicia of inputs to one or more specifications of one or more nodes in a network of nodes. The electronic communications may include data portions from a plurality of electronic devices. In various embodiments, the determining the metrics of interactions may be based at least in part on collecting electronic communications received via a network, processing the data portions using a natural language processing model to identify indicia of inputs in the data portions, collecting the indicia of inputs and matching at least a subset of the indicia of inputs as sharing identical and/or similar components, and mapping at least the subset of the indicia of inputs to one or more specifications of one or more nodes in a network of nodes.

In various embodiments, a network data structure of nodes linked in a network of nodes may be modified. The network of nodes may be configured so that each node of the network of nodes includes respective linked content. The respective linked content may include node specifications corresponding to at least part of the adapted set of content composites. In various embodiments, a graphical representation formatted to at least partially represent the network data structure of the nodes linked in the network of nodes may be created. Each represented node of the graphical representation may include one or more selectable links to access underlying data corresponding to one of the nodes. In various embodiments, presentation of visualization data corresponding to the graphical representation to the endpoint device to facilitate the graphical user interface and access to the graphical representation of at least part of the network data structure may be caused. In various embodiments, the underlying data may include one or both of the respective node specifications and one or more content composites corresponding to the node.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure may be described in conjunction with the following appended figures.

In the appended figures, similar components and/or features may have the same reference label. Further, various components of the same type may be distinguished by following the reference label by a dash and a second label that distinguishes among the similar components. If only the first reference label may be used in the specification, the description may be applicable to any one of the similar components having the same first reference label irrespective of the second reference label.

DETAILED DESCRIPTION

The ensuing description provides preferred exemplary embodiment(s) only, and may be not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Various embodiments will now be discussed in greater detail with reference to the accompanying figures, beginning with FIG. 1.

Figure 1:
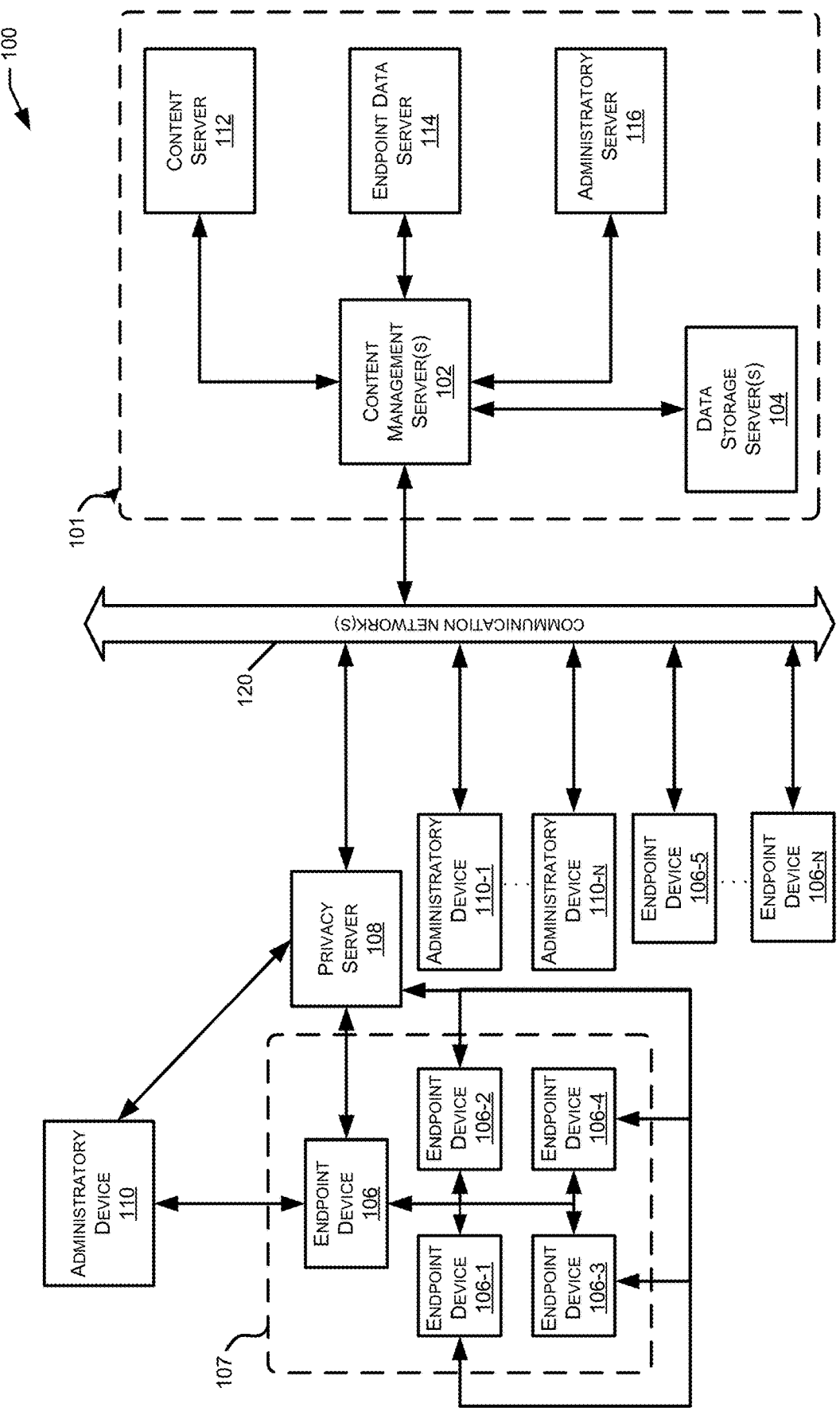
FIG. 1 illustrates a block diagram of various components of a system to facilitate adaptive processing and content control, in accordance with embodiments of the present disclosure.

With reference now to FIG. 1, a block diagram is shown illustrating various components of a system 100 to facilitate adaptive processing and content control, in accordance with embodiments of present disclosure. The system 100 may correspond to, and may be variously referenced herein as, an endpoint adaptation system 100. In some embodiments, the system 100 can comprise one or several physical components and/or one or several virtual components such as, for example, one or several cloud computing components. In some embodiments, the system 100 can comprise a mixture of physical and cloud computing components.

System 100 may include a server system 101 that may include one or more content management servers 102. As discussed below in more detail, content management servers 102 may be any type of server suitable for disclosed embodiments including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The system 100 may include one or more data storage servers 104, such as data storage servers and file-based storage systems. The data storage servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the data storage server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any correct level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives (e.g., Serial AT Attachment drives) or one or several NL-SATA drives.

In some embodiments, the one or several hardware and/or software components of the data storage server 104 can be arranged into one or several storage area networks (SAN), which one or several storage area networks can be one or several dedicated networks that provide access to data storage, and particularly that provides access to combined (eliminating data not useful), block level data storage. A SAN typically has its own network of storage devices that are generally not accessible through the local area network (LAN) by other devices. The SAN allows access to these devices in a manner such that these devices appear to be locally attached to the endpoint device.

Data storages 104 may comprise stored data germane to the functions of the system 100. Illustrative examples of data storages 104 that may be maintained in certain embodiments of the system 100 are described below. In some embodiments, multiple data storages may reside on a single server 104, either using the same storage components of server 104 or using different physical storage components to assure data security and integrity between data storages. In other embodiments, each data storage may have a separate dedicated data storage server 104.

System 100 also may include one or more endpoint devices 106 and/or administrative devices 110. Endpoint devices 106 and administrative devices 110 may display content received via the system 100, and may support various types of endpoint interactions with the content. Endpoint devices 106 and administrative devices 110 may include mobile devices such as smartphones, tablet computers, particular digital assistants, and wearable computing devices. Such mobile devices may run a variety of mobile operating systems and may be enabled for Internet, e-mail, short message service (SMS), Bluetooth®, mobile radio-frequency identification (M-RFID), and/or other communication protocols. Other endpoint devices 106 and administratory devices 110 may be special-purpose computing devices including, by way of example, particular computers, laptop computers, workstation computers, projection devices, and interactive room display systems. Additionally, endpoint devices 106 and administratory devices 110 may be any other electronic devices, such as a thin-client computers, an Internet-enabled gaming systems, business or home appliances, and/or particular messaging devices, capable of communicating over network(s) 120.

In different contexts of systems 100, endpoint devices 106 and administrative devices 110 may correspond to different types of specialized devices. In some embodiments, endpoint devices 106 and administrative devices 110 may operate in the same physical location 107. In such cases, the devices may contain components that support direct communications with other nearby devices, such as wireless transceivers and wireless communications interfaces, Ethernet sockets or other Local Area Network (LAN) interfaces, etc. In other implementations, the endpoint devices 106 and administrative devices 110 need not be used at the same location 107, but may be used in remote geographic locations in which each endpoint device 106 and administratory device 110 may use security features and/or specialized hardware (e.g., hardware-accelerated SSL and HTTPS, WS-Security, firewalls, etc.) to communicate with the content management server 102 and/or other remotely located endpoint devices 106. Additionally, different endpoint devices 106 and administrative devices 110 may be assigned different designated particularized sets of access permissions and, in such cases, the different devices may be provided with additional hardware and/or software components to provide content and support endpoint capabilities not available to the other devices.

The system 100 also may include a privacy server 108 that maintains private endpoint data at the privacy server 108 while using applications or functionalities hosted on other servers. For example, the privacy server 108 may be used to maintain private data of an endpoint within one jurisdiction even though the endpoint is accessing an application hosted on a server (e.g., the content management server 102) located outside the jurisdiction. In such cases, the privacy server 108 may intercept communications between an endpoint device 106 or administrative device 110 and other devices that include private endpoint data. The privacy server 108 may create a token or identifier that does not disclose the private data and may use the token or identifier when communicating with the other servers and systems, instead of using the endpoint's private data.

As illustrated in FIG. 1, the content management server 102 may be in communication with one or more additional servers, such as a content server 112, an endpoint data server 114, and/or an administratory server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to endpoint devices 106 and other devices in the network 100. Content server 112 may include data storages of materials, reviews, diagnostics, interactive programs and simulations, models, outlines, and various interfaces that correspond to different materials and/or different types of endpoint devices 106. In systems 100 used for resource distribution, endpoint interactives, and the like, a content server 112 may include resource content files.

Endpoint data server 114 may include hardware and software components that store and process data for multiple particularized access instances relating to particularized endpoint accesses of the system 100. For example, the content management server 102 may record and track each endpoint's system usage, including their endpoint device 106, content resources accessed, and interactions with other endpoint devices 106. This data may be stored and processed by the endpoint data server 114, to support endpoint tracking and analysis features. For instance, the endpoint data server 114 may store and analyze each endpoint's access histories, attendances, completions, interactions, diagnostic results, and the like. The endpoint data server 114 may also include a repository for endpoint-created material, such as diagnostics and tests completed by endpoints, and documents and assignments prepared by endpoints. In the context of resource distribution and interactive gaming, the endpoint data server 114 may store and process resource access data for multiple endpoints (e.g., content titles accessed, access times, data usage amounts, interaction histories, endpoint devices and device types, etc.).

Administratory server 116 may include hardware and software components to initiate various administrative functions at the content management server 102 and other components within the system 100. For example, the administratory server 116 may monitor device status and performance for the various servers, data storages, and/or endpoint devices 106 in the system 100. When necessary, the administratory server 116 may add or remove devices from the network 100, and perform device maintenance such as providing software updates to the devices in the network 100. Various administrative tools on the administratory server 116 may allow authorized endpoints to set endpoint access permissions to various content resources, monitor resource usage by endpoints and devices 106, and perform analyses and generate reports on specific network endpoints and/or devices (e.g., resource usage tracking reports, development diagnostics, etc.).

The system 100 may include one or more communication networks 120. Although only a single network 120 is identified in FIG. 1, the system 100 may include any number of different communication networks between any of the computer servers and devices shown in FIG. 1 and/or other devices described herein. Communication networks 120 may enable communication between the various computing devices, servers, and other components of the system 100. As discussed below, various implementations of systems 100 may employ different types of networks 120, for example, computer networks, telecommunications networks, wireless networks, and/or any combination of these and/or other networks.

Figure 2:
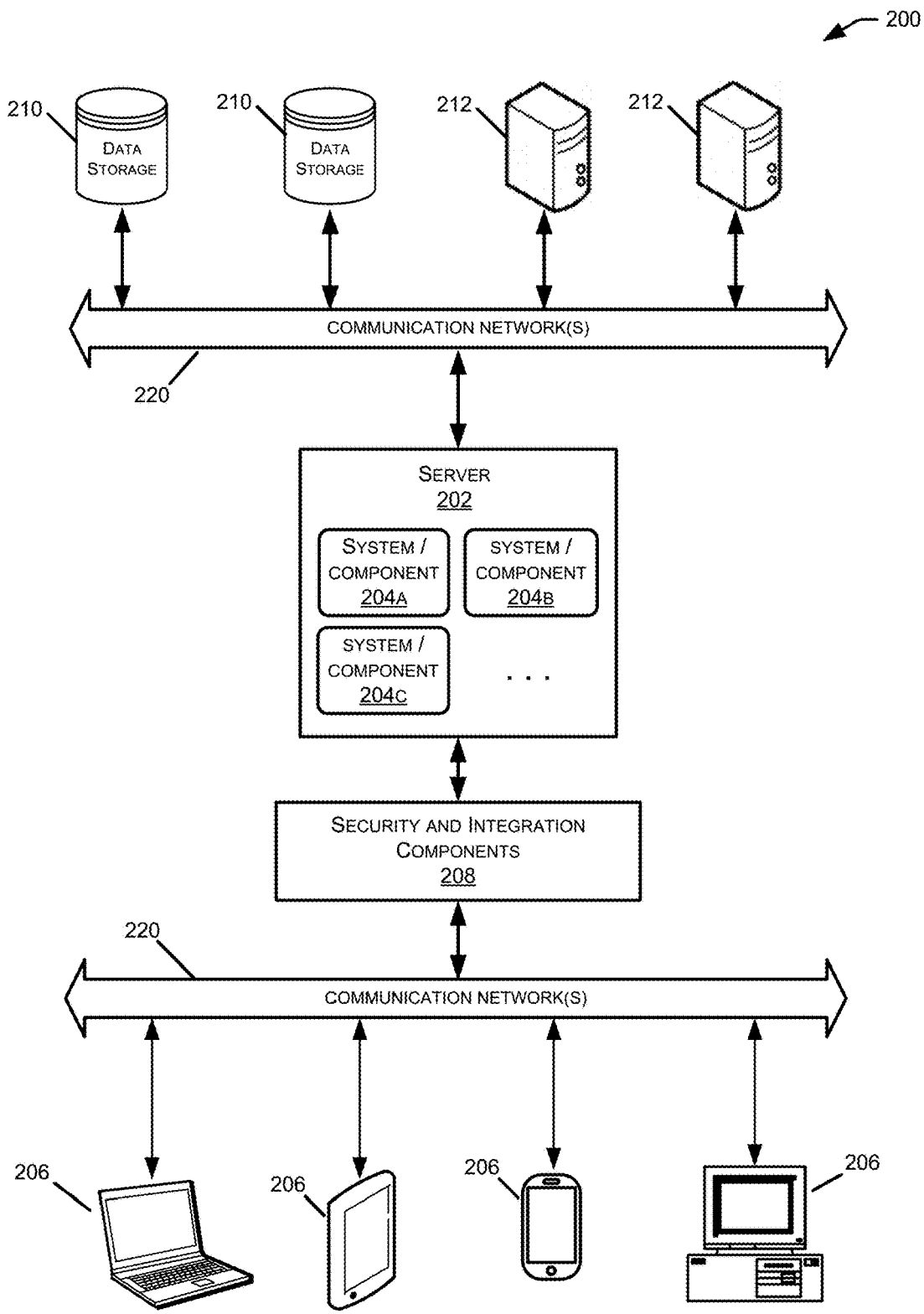
FIG. 2 illustrates a block diagram of distributed computing environment for the system to facilitate adaptive processing and content control, in accordance with embodiments of the present disclosure.

With reference to FIG. 2, an illustrative distributed computing environment 200 is shown including one or more computer servers 202, four client computing devices 206, and other components that may implement certain embodiments and features described herein. In some embodiments, the server 202 may correspond to the server system 101 (e.g., the content management server 102) discussed above in FIG. 1, and the client computing devices 206 may correspond to the endpoint devices 106 and devices 110. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or functionalities, for example, web-based or cloud-based, to support resource access and interaction with client devices 206. Endpoints operating client devices 206 may in turn utilize one or more client applications (e.g., virtual client applications) to interact with server 202 to utilize the functionalities provided by these components.

Various different subsystems and/or components 204 may be implemented on server 202. Endpoints operating the client devices 206 may initiate one or more client applications to use functionalities provided by these subsystems and components. The subsystems and components within the server 202 and client devices 206 may be implemented in hardware, firmware, software, or combinations thereof. Various different system configurations are possible in different distributed computing systems 200 and endpoint adaptation systems 100. The embodiment shown is thus one example of a distributed computing system and is not intended to be limiting. Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 that may be included the server system 101 and that may be used to send and manage communications between the server 202 and endpoint devices 206 over one or more communication networks 220. In embodiments disclosed herein, the endpoint device 106 may include or otherwise correspond to endpoint device 206. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of the same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data communication and storage, such as authenticating endpoints and restricting access to unknown or unauthorized endpoints. In various implementations, security and integration components 208 may provide, for example, a file-based integration scheme or a webservice (WS) based integration scheme for transmitting data between the various devices in the endpoint adaptation system 100. Security and integration components 208 also may use secure data communication protocols and/or encryption for data transfers, for example, File Transfer Protocol (FTP), Secure File Transfer Protocol (SFTP), and/or Pretty Good Privacy (PGP) encryption.

In some embodiments, one or more WSs may be implemented within the security and integration components 208 and/or elsewhere within the endpoint adaptation system 100. Such WSs, including cross-domain and/or cross-platform WSs, may be developed for enterprise use in accordance with various WS standards, such as RESTful WSs (i.e., those based on the Representation State Transfer (REST) architectural style and constraints), and/or WSs designed in accordance with the WS Interoperability (WS-I) guidelines. Some WSs may use the Secure Sockets Layer (SSL) or Transport Layer Security (TLS) protocol to provide secure connections between the server 202 and endpoint devices 206. SSL or TLS may use HTTP or HTTPS to provide authentication and confidentiality. In other examples, WSs may be implemented using REST over HTTPS with the OAuth open standard for authentication, or using the WS-Security standard which provides for secure SOAP (e.g., Simple Object Access Protocol) messages using Extensible Markup Language (XML) encryption. In other examples, the security and integration components 208 may include specialized hardware for providing secure WSs. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring, and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data storages 210 and/or back-end servers 212 that may be included in the server system 101. In certain examples, the data storages 210 may correspond to data storage server(s) 104 disclosed above, and back-end servers 212 may correspond to the various back-end servers 112-116. Data storages 210 and servers 212 may reside in the same datacenter or may operate at a remote location from server 202. In some cases, one or more data storages 210 may reside on a non-transitory storage medium within the server 202. Other data storages 210 and back-end servers 212 may be remote from server 202 and configured to communicate with server 202 via one or more networks 220. In certain embodiments, data storages 210 and back-end servers 212 may reside in a storage-area network (SAN), or may use STorageasaService (STaaS) architectural model.

The endpoint adaptation system 100 can include one or more adaptive processing devices. The one or more adaptive processing devices can provide instructions to and receive information from the other components of the endpoint adaptation system 100. The one or more adaptive processing devices can act according to stored instructions, which stored instructions can be located in memory associated with the one or more processors and/or in other components of the endpoint adaptation system 100. In various embodiments, the one or more adaptive processing devices may correspond to one or more processors of one or a combination of the devices 106, 108, 102, 114, 206, 208, and/or 212 specially adapted to adaptively secure a set of access operations with respect to one or more electronic resources as disclosed herein.

Figure 3:
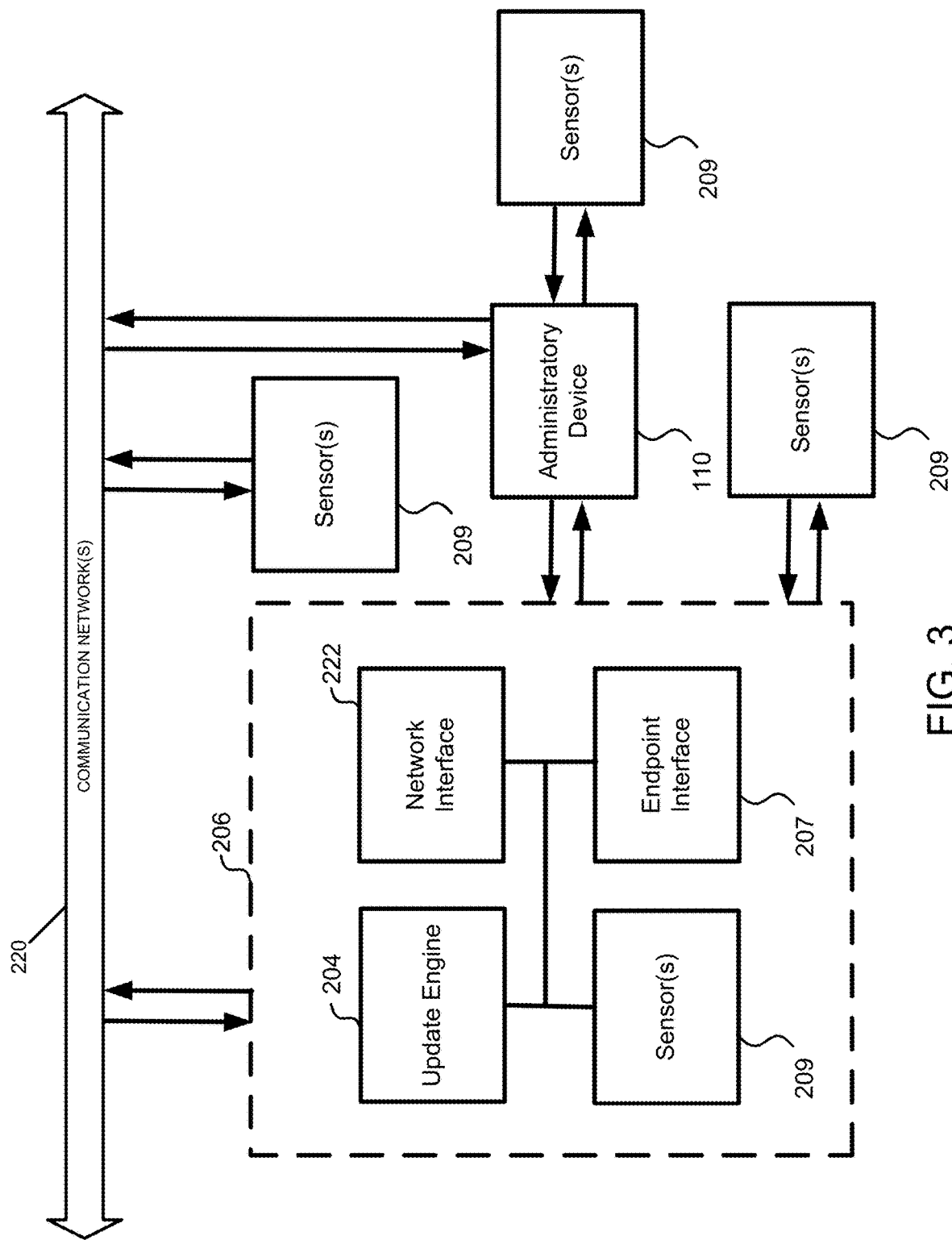
FIG. 3 illustrates a block diagram of an endpoint device, in accordance with embodiments of the present disclosure.

With reference now to FIG. 3, a block diagram of one embodiment of an endpoint device 206 is shown. As discussed above, the endpoint device 206 can be configured to provide data to and/or receive data from other components of the endpoint adaptation system 100. The endpoint device 206 can access the endpoint adaptation system 100 through any desired means or technology, including, for example, a webpage such as, for example, a social network service page, or a web portal. As depicted, the endpoint device 206 can include a network interface 222. The network interface 222 allows the endpoint device 206 to access the other components of the endpoint adaptation system 100, and specifically allows the endpoint device 206 to access the network of the endpoint adaptation system 100. The network interface 222 can include features configured to send and receive information, including, for example, an antenna, a modem/router, a transmitter, receiver, or any other feature that can send and receive information. The network interface 222 can communicate via telephone, cable, fiber-optic, or any other wired communication network. In some embodiments, the network interface 222 can communicate via cellular networks, WLAN networks, or any other wireless network.

The endpoint device 206 can include an update engine 204. The update engine 204 can facilitate updating any information within the endpoint adaptation system 100. In some embodiments, for example, the update engine 204 can be used to update the graphical user interface in accordance with embodiments disclosed herein. The endpoint device 206 can include an endpoint interface 207 that communicates information to, and receives inputs from an endpoint. The endpoint interface 207 can include a screen, a speaker, a monitor, a keyboard, a microphone, a mouse, a touchpad, a keypad, or any other feature or features that can receive inputs from an endpoint and provide information to an endpoint.

The endpoint adaptation system 100 can include one or more sensors 209. Various embodiments of the endpoint adaptation system 100 can include multiple sets of one or more sensors 209, e.g., two, three, four, ten, or many more sets of one or more sensors. For example, several sets of one or more sensors 209 may be configured to capture phenomena at several endpoint devices 206 at one or more locations 107. Additionally or alternatively, several sets of one or more sensors may be configured to capture phenomena at a single endpoint device 206. One or more sets of one or more sensors 209 may be communicatively coupled to the endpoint device 206. Additionally or alternatively, one or more sets of one or more sensors may be communicatively coupled to the device 110 and/or the server 108. An endpoint subsystem may include one or more endpoint devices 106, 206 and one or more sensors 209. In some embodiments, one or more sets of one or more sensors 209 may be integrated with the endpoint device 206. Additionally or alternatively, one or more sets of one or more sensors may be external to the endpoint device 206. A plurality of sensors 209 may include different types of sensors 209, each different type of sensor 209 configured to detect a different type of phenomena and/or generate a different type of data based on the detected phenomena. Data captured from such sensors may be used in monitor processes disclosed herein. For example, data from various types of sensors 209 may be used for monitoring user inputs, usage metrics, and associated time metrics.

The endpoint adaptation system 100 (e.g., each of endpoint device 206, the device 110 and/or the server 108) may be configured to communicate with one or more sensors 209. Such communication may use different communication standards or protocols. In various embodiments, for example, the sensors 209 can be communicatively connected to and controllable by the endpoint adaptation system 100, including, for example, the device 110 and/or backend devices such as devices 102, 116, and/or the like.

Sensors and control units may be coupled and the sensors 209 may be connected in a serial, parallel, star, hierarchical, and/or the like topologies and may communicate to the endpoint device 206, the device 110 and/or the server 108 via one or more serial, bus, or wireless protocols and technologies which may include, for example, WiFi, CAN bus, Bluetooth, I2C bus, ZigBee, Z-Wave and/or the like. For instance, one or more sensors 209 may use a ZigBee® communication protocol while one or more other sensors 209 communicate with endpoint device 206, the device 110 and/or the server 108 using a Z-Wave® communication protocol. Other forms of wireless communication may be used by sensors 209 and the endpoint device 206, the device 110 and/or the server 108. For instance, one or more sensors 209 and the endpoint device 206, the device 110 and/or the server 108 may be configured to communicate using a wireless local area network, which may use a communication protocol such as 802.11.

The one or more sensors 209 may include a fingerprint scanner and/or a different type of biometric scanner for biometric identification, such as a retina scanner that may be used for optical identification. Further, the one or more sensors 209 may include, for example, one or more cameras. The camera can be any device configured to generate image and/or audio data including, for example, still image data, video image data, and/or any sound data, corresponding to detected phenomena. The one or more sensors 209 of different types may include infrared sensors and/or heat sensors. In some embodiments, the camera(s) may include one or more infrared cameras. The camera(s) may, in some embodiments, include infrared sensors. The camera(s) may provide a video and, in some embodiments, an audio stream. The endpoint adaptation system 100 may perform image analysis of image data captured with cameras to determine one or more image baselines for endpoints and areas proximate thereto. Captured endpoint image data may be correlated to reference images using any suitable facial trait qualifications for correlation.

The one or more sensors 209 may include one or more microphones and/or another audio sensor (which may or may not be dedicated to capturing audio data for audio analysis). The endpoint adaptation system 100 may perform audio analysis of audio data captured with audio sensor and/or microphones on one or more other authentication control devices to determine one or more sound baselines for the endpoint and the area proximate thereto. The matching engine 507 may learn patterns of sensor-based data metrics corresponding to audio characteristics disclosed herein, such as tonal, pitch, and volume characteristics; keywords and corresponding language used; cadence, pauses, and accents; ambient noise; and/or the like as distinctive markings.

Additionally, the one or more sensors 209 may correspond to the device 206 input devices to enable recording of data pertaining to keystrokes, typing characteristics, such as typing speed, keystroke pressure, typing accuracy/inaccuracy, usage of input options, and/or the like. Some embodiments may perform analysis of such data to determine one or more sound baselines for the endpoint and the area proximate thereto. Such typing observations may be used by the system to identify inconsistencies/nonconformities of real-time typing detection with respect to particularized patterns. Sensor data from sensors 209 may be recorded by the device 206, device 110, a backend device such device 102, 104, 113, 114, 116, and/or storage on external storage devices, such as a network attached storage device.

Figure 4:
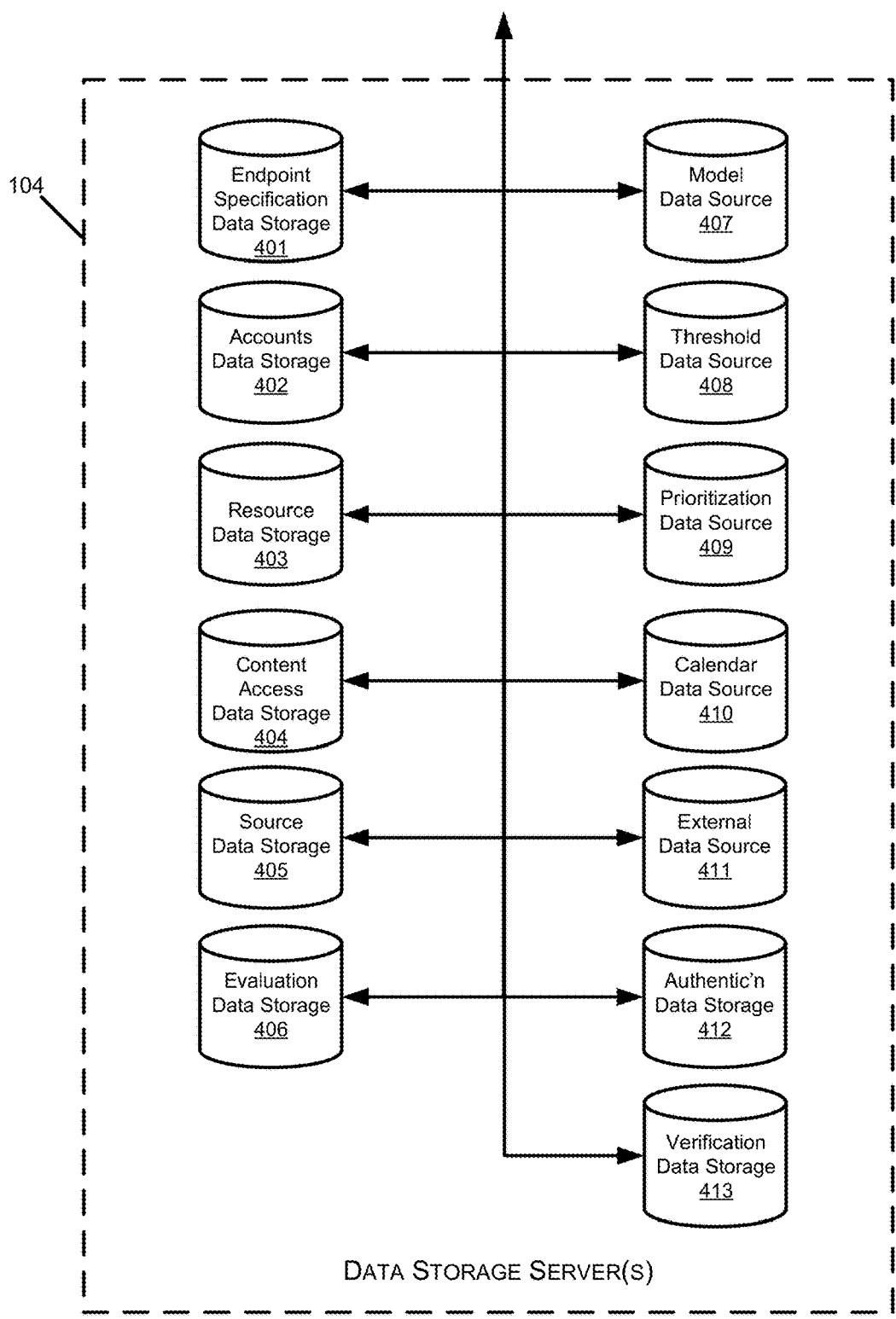
FIG. 4 illustrates a block diagram of a set of data storages and/or data storage servers corresponding to the data storage servers of the endpoint adaptation system, in accordance with embodiments of the present disclosure.

With reference to FIG. 4, an illustrative set of data storages and/or data storage servers is shown, corresponding to the data storage servers 104 of the endpoint adaptation system 100 discussed above in FIG. 1. One or more particular data storages 401-311 may reside in storage on a single computer server 104 (or a single server farm or cluster) under the control of a single entity, may be virtually implemented, or may reside on separate servers operated at different remote locations. In some embodiments, data storages 401-311 may be accessed by the content management server 102 and/or other devices and servers within the network 100 (e.g., endpoint devices 106, administratory devices 110, administratory servers 116, etc.). Access to one or more of the data storages 401-311 may be limited or denied based on the processes, endpoint credentials, and/or devices attempting to interact with the data storage.

The following description includes examples of specific data storages that may be implemented within some embodiments of an endpoint adaptation system 100. It should be understood that the below descriptions of data storages 401-311, including their functionality and types of data storage therein, are illustrative and non-limiting. Data storages server architecture, design, and the execution of specific data storages 401-311 may depend on the context, size, and functional requirements of an endpoint adaptation system 100. For example, in endpoint adaptation systems 100 used for development purposes, separate data storages or file-based storage systems may be implemented in data storage server(s) 104 to store development module, data development results, diagnostics data, and the like. In contrast, in endpoint adaptation systems 100 used for resource access from resource repositories, separate data storages may be implemented in data storages server(s) 104 to store available resource descriptors, access statistics, endpoint specifications, network statistics, etc.

An endpoint specification data storage 401 may include endpoint specification data relating to endpoint characteristics such as the endpoint identifiers, access credentials, endpoint preferences, and data relating to any previous endpoint interactions within the endpoint adaptation system 100 (e.g., requested resources, posted content, resource modules completed, development scores or diagnostics, other associated endpoints, etc.). In some embodiments, this data can relate to one or several particular endpoints such as, for example, one or several endpoints, administratory devices, or the like, and in some embodiments, this data can relate to one or several institutional endpoints. In some embodiments, this data can identify one or several endpoint memberships in one or several groups.

The endpoint specification data storage 401 can include data relating to an endpoint's status, location, or the like. This data can identify, for example, an endpoint device in use, the location of that device, or the like. In some embodiments, this data can be created based on any location detection technology including, for example, a location-detection system, or the like. In some embodiments, for example, data relating to one or more performance attributes of the endpoint can include, for example, data indicative of the endpoint's past performance. This information can include, for example, data relating to courses of study that the endpoint has completed and/or data relating to the endpoint's performance in the completed courses. In some embodiments, for example, the data relating to one or more performance attributes of the endpoint can include authenticated operations that the endpoint has completed and/or the endpoint's performance in the completed authenticated operations. In some embodiments, for example, the data relating to one or more performance attributes of the endpoint can include an identification of information and/or topics that the endpoint has mastered and/or identification of information and/or topics that the endpoint has not mastered.

In some embodiments, for example, data relating to one or more interaction attributes of the endpoint can include, for example, information relating to how the endpoint interacts with components of the adaptive authentication system 100. This information can include, for example, the endpoint's patterns for providing inputs to the adaptive authentication system 100. In some embodiments, for example, this information can include endpoint preferences such as the input device such as, for example, a keyboard, a number pad, a mouse, a joystick, track ball, and microphone, with which the endpoint normally provides inputs to the adaptive authentication system 100.

In some embodiments, for example, the endpoint specification data storage 401 can comprise login information. This information can include, for example, information identifying an endpoint such as, for example, an endpoint name and password or an endpoint identification number. In some embodiments, for example, when an endpoint desires to access the adaptive authentication system 100, the endpoint can be prompted to enter identification information such as, for example, a name and password. After the endpoint provides the identification information, the adaptive authentication system 100 can verify the identification information, and specifically, the one or more adaptive processing devices can compare the endpoint-provided identification information to information stored within the endpoint specification data storage 401 to determine if the actual endpoint is an authorized endpoint.

In some embodiments, the endpoint specification data stored in the endpoint specification data storage 401 can be dynamically updated over time to reflect changes to the endpoint. In some embodiments, these changes can be, for example, a change in appearance, a change in performance, a change in a preference and/or interaction, or the like. In some embodiments, these updates to the endpoint specification data storage 401 can be based on actual measured changes in the appearance, performance, preference and/or interaction, or the like, and in some embodiments these updates to the endpoint specification data storage 401 can be based on a predictive algorithm which can, for example, predict changes in appearance, performance, preference and/or interaction, or the like.

Data relating to the endpoint's status can identify, for example, logged-in status data that can indicate whether the endpoint device is presently logged-in to the endpoint adaptation system 100 and/or whether the log-in is active. In some embodiments, the data relating to the endpoint's status can identify whether the endpoint is currently accessing content and/or participating in an activity from the endpoint adaptation system 100.

In some embodiments, data relating to the endpoint's status can identify, for example, one or several attributes of the endpoint's interaction with the endpoint adaptation system 100, and/or content distributed by the endpoint adaptation system 100. This can include data identifying the endpoint's interactions with the endpoint adaptation system 100, the content processed by the endpoint through the endpoint adaptation system 100, or the like. In some embodiments, this can include data identifying the type of data accessed through the endpoint adaptation system 100 and/or the type of activity performed by the endpoint via the endpoint adaptation system 100, the lapsed time since the last time the endpoint accessed content and/or participated in an activity from the endpoint adaptation system 100, or the like. In some embodiments, this data can relate to a content program comprising an aggregate of data, content, and/or activities, and can identify, for example, progress through the content program, or through the aggregate of data, content, and/or activities forming the content program. In some embodiments, this data can track, for example, the amount of time since participation in and/or completion of one or several types of activities, the amount of time since communication with one or several administrators and/or administratory devices 110, or the like.

In some embodiments, the endpoint specification data storage 401 can further include data relating to particular development records, statuses, and diagnostic metrics. In some embodiments, the development records can further include data identifying diagnostic metrics on one or several diagnostics and/or assignments. The endpoint specification data storage 401 can include data relating to one or several particular processing modes. In some embodiments, for example, the endpoint, also referred to herein as the particular or the particular endpoint, may have one or several processing modes, one or several most effective processing modes, and/or the like. In some embodiments, the endpoint's processing modes can be any processing modes describing how the endpoint best adapts or how the endpoint tends to adapt. In one embodiment, these processing modes can include, for example, identification of the endpoint as an auditory adapter, as a visual adapter, and/or as a tactile adapter. In some embodiments, the data identifying one or several endpoint processing modes can include data identifying an adaptive approach based on the endpoint's development history such as, for example, identifying an endpoint as an auditory adapter when the endpoint has received significantly higher scores on assignments and/or in processes favorable to auditory adapters. In some embodiments, this data can be stored in a tier of memory that is not the fastest memory in the endpoint adaptation system 100.

In some embodiments, the endpoint specification data storage 401 can further include data identifying one or several endpoint performance levels. In some embodiments, these one or several endpoint performance levels can identify a performance level determined based on past performance by the endpoint interacting with the endpoint adaptation system 100, and in some embodiments, these one or several endpoint performance levels can identify a predicted performance level determined based on past performance by the endpoint interacting with the endpoint adaptation system 100 and one or several predictive models.

A particularized records data storage 402 may generate and store particularized record data for different endpoints within the endpoint adaptation system 100. Particularized records may be created for particular endpoints, administrators, and the like. Particularized record data may include various particularized sets of access permissions, particularized record types, current particularized record status, particularized record characteristics, and any parameters and/or restrictions associated with the particularized records.

A content object data storage 403 may include data describing the particular content objects available via the endpoint adaptation system 100. In some embodiments, these data packets can be linked in the object network according to one or several prerequisite relationships that can, for example, identify the relative hierarchy and/or difficulty of the data objects. In some embodiments, such a hierarchy of data objects can be created by the endpoint adaptation system 100 according to endpoint performance with the object network, and in some embodiments, this hierarchy of data objects can be created based on one or several existing and/or external hierarchies such as, for example, a process flow, an index, or the like. In some embodiments, for example, the object network can correspond to a process flow such that content objects for the process flow correspond to the object network.

In some embodiments, the content object data storage 403 can comprise a process flow, a scheduler output, or the like that identify one or several operations and/or events for the endpoint device. In some embodiments, for example, when the endpoint device is a member of a group of endpoint devices, these operations and/or events germane to the endpoint can identify one or several assignments, tests, or the like.

In some embodiments, the content object data storage 403 may include metadata, properties, and other characteristics associated with the content resources stored in the content server 112. Such data may identify one or more aspects or content attributes of the associated content resources, for example, subject matter, access level, or performance level of the content resources, rating attributes for the content resources (e.g., data indicating the diagnostic or effectiveness of the content resource), and the like. In some embodiments, the content object data storage 403 may be configured to allow updating of content metadata or properties, and to allow the addition and/or removal of data relating to the content resources. For example, content relationships may be implemented as graph structures, which may be stored in the content object data storage 403 or in an additional storage for use by selection algorithms along with the other metadata.

In some embodiments, the content object data storage 403 can contain data used in evaluating responses received from endpoints. In some embodiments, for example, an endpoint can receive content from the endpoint adaptation system 100 and can, subsequent to receiving that content, provide a response to the received content. In some embodiments, for example, the received content can comprise one or several queries, prompts, or the like, and the response to the received content can comprise an answer to those one or several queries, prompts, or the like. In some embodiments, data, referred to herein as comparative data, from the content object data storage 403 can be used to determine whether the responses are the correct responses.

In some embodiments, the content object data storage 403 and/or the endpoint specification data storage 401 can comprise an aggregation network also referred to herein as a content object network. The aggregation network can comprise a plurality of content aggregations that can be linked together by, for example: creation by common endpoint; relation to a common subject, topic, performance, or the like; creation from a common set of source material such as source data packets; or the like. In some embodiments, the content aggregation can comprise a collection/arrangement of content comprising the presentation portion that can be provided to the endpoint in the form of, for example, a query-response object and an extraction portion that can comprise the correct response to the presentation portion such as for example, an answer to a query-response object. In some embodiments, one or several content aggregations can be created by the endpoint adaptation system 100 and can be related to one or several data packets they can be, for example, organized in object network. In some embodiments, the one or several content aggregations can be each created from content stored in one or several of the data packets.

In some embodiments, the content aggregations located in the content object data storage 403 and/or the endpoint specification data storage 401 can be associated with an endpoint-creator of those content aggregations. In some embodiments, access to content aggregations can vary based on, for example, whether an endpoint created the content aggregations. In some embodiments, the content object data storage 403 and/or the endpoint specification data storage 401 can comprise a data storage of content aggregations associated with a specific endpoint, and in some embodiments, the content object data storage 403 and/or the endpoint specification data storage 401 can comprise a plurality of data storages of content aggregations that are each associated with a specific endpoint. In some embodiments, these data storages of content aggregations can include content aggregations created by their specific endpoint and in some embodiments, these data storages of content aggregations can further include content aggregations selected for inclusion by their specific endpoint and/or an administrator of that specific endpoint. In some embodiments, these content aggregations can be arranged and/or linked in a hierarchical relationship similar to the data packets in the object network and/or linked to the object network in the object network or the operations or performances associated with the data packets in the object network or the process flow or scheduler output. In some embodiments, the content object network, and the content aggregations forming the content object network, can be organized according to the object network and/or the hierarchical relationships embodied in the object network. In some embodiments, the content object network, and/or the content aggregations forming the content object network, can be organized according to one or several operations identified in the process flow, scheduler output or the like.

A content access data storage 404 may include access permissions and security data for the endpoint adaptation system 100 and specific content resources. For example, the content access data storage 404 may include login data (e.g., endpoint identifiers, logins, passwords, etc.) that can be verified during endpoint login attempts to the network 100. The content access data storage 404 also may be used to store assigned endpoint particularized sets of access permissions and/or endpoint levels of access. For example, an endpoint's access level may correspond to the sets of content resources and/or the client or server applications that the endpoint is permitted to access. Certain endpoints may be permitted or denied access to certain applications and resources based on their development program, process/performance level, etc. Certain endpoints may have administratory access over one or more endpoints, allowing the administrator to access all or portions of the end endpoint's content, activities, diagnostics, etc. Additionally, certain endpoints may have administrative access over some endpoints and/or some applications in the endpoint adaptation system 100, allowing such endpoints to add and remove endpoint particularized records, modify endpoint access permissions, perform maintenance updates on software and servers, etc.

A source data storage 405 may include data relating to the source of the content resources available via the endpoint adaptation system. For example, a source data storage 405 may identify the authors and originating devices of content resources, previous pieces of data and/or groups of data originating from the same authors or originating devices and the like.

An diagnostic data storage 406 may include data used to direct the diagnostics of endpoints and content resources in the endpoint adaptation system 100. In some embodiments, the diagnostic data storage 406 may contain, for example, the analysis criteria and the analysis guidelines for evaluating endpoints and/or for evaluating the content resources in the network 100. The diagnostic data storage 406 also may include data relating to diagnostic processing operations, for example, the identification of endpoints and endpoint devices 106 that have received certain content resources or accessed certain applications, the status of diagnostics or diagnostic histories for content resources, endpoints, or applications, and the like. Diagnostic criteria may be stored in the diagnostic data storage 406 including data and/or instructions in the form of one or several electronic rubrics or scoring guides for use in the diagnostic of the content, endpoints, or applications. The diagnostic data storage 406 also may include past diagnostics and/or diagnostic analyses for endpoints, content, and applications, including relative rankings, characterizations, explanations, and the like.

A model data storage 407, also referred to herein as a model data storage 407 can store data relating to one or several predictive models. In some embodiments, these can include one or several evidence models, probability models, performance models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to an endpoint and/or to one or several content objects. Specifically, one or several inputs relating to the endpoint and/or to one or several content objects can be inserted into the evidence model. These inputs can include, for example, one or several measures of endpoint performance level, one or several measures of content object difficulty and/or performance level, or the like. The customized evidence model can then be used to predict the likelihood of the endpoint providing correct or incorrect responses to one or several of the content objects.

A threshold data storage 408 can store one or several threshold values. These one or several threshold values can delineate between states or conditions. In one exemplary embodiment, for example, a threshold value can delineate between an acceptable endpoint performance and an unacceptable endpoint performance, between content appropriate for an endpoint and content that is inappropriate for an endpoint, between probability levels, or the like.

A prioritization data storage 409 can include data relating to one or several operations and the prioritization of those one or several operations with respect to each other. In some embodiments, the prioritization data storage 409 can be unique to a specific endpoint, and in some embodiments, the prioritization data storage 409 can be applicable to a plurality of endpoints. In some embodiments in which the prioritization data storage 409 is unique to a specific endpoint, the prioritization data storage 409 can be a sub-data storage of the endpoint specification data storage 401. In some embodiments, the prioritization data storage 409 can include data identifying a plurality of operations and a relative prioritization amongst that plurality of operations. In some embodiments, this prioritization can be static and in some embodiments, this prioritization can be dynamic in that the prioritization can change based on updates, for example, one or several of the operations, the endpoint specification data storage 401, or the like. In some embodiments, the prioritization data storage 409 can include data relating to operations associated with a single process, group, class, or the like, and in some embodiments, the prioritization data storage 409 can include data relating to operations associated with a plurality of processes, groups, classes, or the like. An operation can define an objective and/or result and can be associated with one or several data packets that can, for example, contribute to endpoint obtainment of the objective and/or result. In some embodiments, some or all of the data packets contained in the content object data storage 403 can be linked with one or several operations retained in the prioritization data storage 409 such that a single operation can be linked and/or associated with one or several data packets.

The prioritization data storage 409 can further include data germane to the prioritization of one or several operations and/or the prioritization data storage 409 can include data that can be used in determining the prioritization of one or several operations. In some embodiments, this can include weight data which can identify a relative and/or absolute weight of a operation. In some embodiments, for example, the weight data can identify the degree to which an operation contributes to an outcome such as, for example, a score or a grade. In some embodiments, this weight data can specify the portion and/or percent of a grade of a class, section, process, or study that results from, and/or that is associated with the operation.

The prioritization data storage 409 can further include data germane to the composition of the operation. In some embodiments, for example, this data, also referred to herein as a composition value, can identify one or several sub-operations and/or content categories forming the operations, as well as a contribution of each of those sub-operations and/or content categories to the operation. In some embodiments, the application of the weight data to the composition value can result in the identification of a contribution value for the operation and/or for the one or several sub-operations and/or content categories forming the operation. This contribution value can identify the contribution of one, some, or all of the sub-operations and/or content categories to the outcome such as, for example, the score or the grade.

The calendar data source 410, also referred to herein as the calendar data storage 410 can include timing data germane to the operations contained in the prioritization data storage 409. In some embodiments, this timing data can identify one or several dates by which the operations should be completed, one or several event dates associated with the operation such as, for example, one or several due dates, test dates, or the like, excluded day data, or the like. In some embodiments, the calendar data storage 410 can further include any data provided to the endpoint relating to other objectives, commitments, or the like.

In addition to the illustrative data storages described above, data storage server(s) 104 (e.g., data storage servers, file-based storage servers, etc.) may include one or more external data aggregators 411. External data aggregators 411 may include external data sources accessible to the endpoint adaptation system 100, but not maintained by the endpoint adaptation system 100. External data aggregators 411 may include any electronic data source relating to the endpoints, content resources, or applications of the endpoint adaptation system 100. For example, external data aggregators 411 may be external data storages containing development-related data and the like. Data retrieved from various external data aggregators 411 may be used to verify and update endpoint particularized record data, suggest endpoint content, and perform endpoint and content diagnostics.

An authentication data storage 412 can include authentication data collected during the performance of the authenticated operation. This authentication data can include any information collected and/or collectible during the authenticated operation and useful in identifying the actual endpoint. This information can, in some embodiments, correspond to information stored in the endpoint specification data storage 401.

A verification data storage 413 can include information used in determining and/or verifying the identity of the actual endpoint. In some embodiments, for example, this information can include algorithms and/or procedures for comparing endpoint specification data with authentication data and/or for processing results of the comparison of the endpoint specification data with the authentication data. In some embodiments, the verification data storage 413 can include, for example, criteria and/or thresholds useful in evaluating the results of the comparison of endpoint specification data with authentication data.

Figure 5:
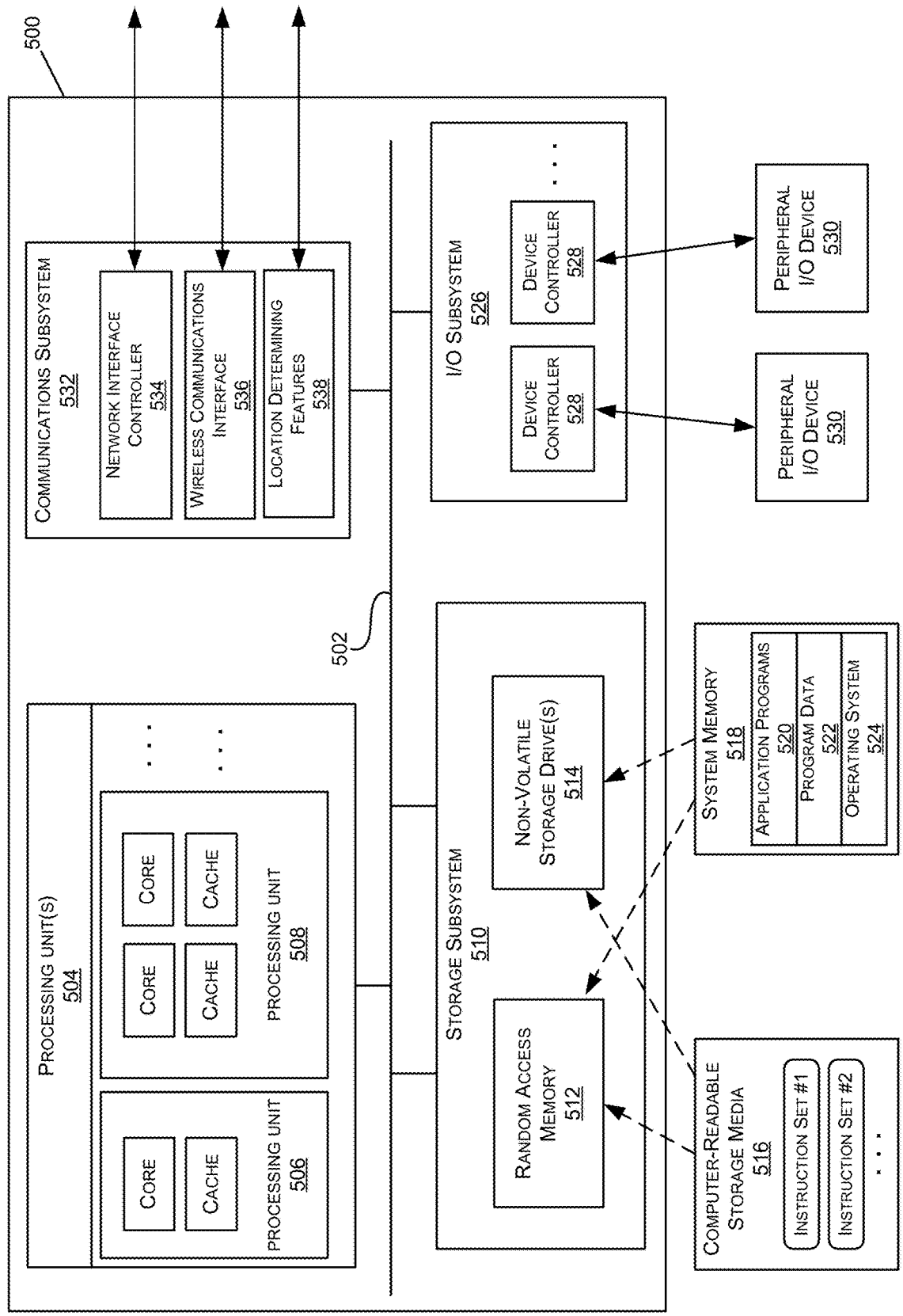
FIG. 5 illustrates a block diagram of a computer system of the endpoint adaptation system, in accordance with embodiments of the present disclosure.

With reference now to FIG. 5, a block diagram of an illustrative computer system is shown. The system 500 may correspond to any of the computing devices or servers of the content access network 100 described above, or any other computing devices described herein, and specifically can include, for example, one or several of the endpoint devices 106, the administrator device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the FIG., processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more endpoint interface input devices and/or endpoint interface output devices 530. Endpoint interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to an endpoint by converting one or several electrical signals to endpoint perceptible and/or interpretable form, and may receive one or several inputs from the endpoint by generating one or several electrical signals based on one or several endpoint-caused interactions with the I/O subsystem such as the actuating of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/ visual devices such as speakers, digital cameras, digital camcorders, portable resource players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable endpoints to control and interact with an input device through a natural endpoint interface using gestures and spoken commands, eye gesture recognition devices that detect eye activity from endpoints and transform the eye gestures as input into an input device, voice recognition sensing devices that enable endpoints to interact with voice recognition systems through voice commands, imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting data from computer system 500 to an endpoint or other computer. For example, output devices 530 may include, without limitation, a variety of display devices that visually convey text, graphics, and audio/video data such as monitors, printers, speakers, headphones, navigation systems, plotters, voice output devices, and modems/routers.

Computer system 500 may comprise one or more storage subsystems 510, comprising hardware and software components used for storing data and program instructions, such as system memory 518 and computer-readable storage resource 516. The system memory 518 and/or computer-readable storage resource 516 may store program instructions that are loadable and executable on processing units 504, as well as data created during the execution of these programs.

Depending on the configuration and type of computer system 500, system memory 518 may be stored in volatile memory (such as random access memory (RAM) 512) and/or in non-volatile storage drives 514 (such as read-only memory (ROM), flash memory, etc.). The RAM 512 may contain data and/or program modules that are intermediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer data between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage resource 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present disclosure.

Storage subsystem 510 may also include a computer-readable storage resource reader that can further be connected to computer-readable storage resource 516. Together and, optionally, in combination with system memory 518, computer-readable storage resource 516 may comprehensively represent remote, local, fixed, and/or removable storage devices plus storage resource for temporarily and/or more permanently containing, storing, transmitting, and retrieving computer-readable data.

Computer-readable storage resource 516 containing program code, or portions of program code, may include any appropriate resource known or used in the art, including storage resource and communication resource, such as, but not limited to, volatile and non-volatile, removable and non-removable resource implemented in any method or technology for storing and/or transmitting of data. This can include tangible computer-readable storage resource such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable resource. This can also include nontangible computer-readable resource, such as data signals, data transmitting, or any other medium which can be used to transmit the correct data and which can be accessed by computer system 500.

By way of example, computer-readable storage resource 516 may include a hard disk drive that reads from or writes to non-removable, nonvolatile magnetic resource, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical resource. Computer-readable storage resource 516 may include, but is not limited to, Zip® drives, flash memory cards, universal serial bus (USB) flash drives, secure digital (SD) cards, DVD disks, digital video tape, and the like. Computer-readable storage resource 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable resource may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems/routers (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G, 5G, or EDGE (enhanced data rates for global evolution), WiFi (IEEE 802.11 standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more endpoints who may use or access computer system 500. For example, communications subsystem 532 may be configured to receive data feeds in real-time from endpoints of social networks and/or other communication functionalities, web feeds such as Rich Site Summary (RSS) feeds, and/or real-time updates from one or more third party data sources (e.g., external data source 411). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data storages 104 that may be in communication with one or more streaming data source computers coupled to computer system 500.

Due to the ever-changing nature of computers and networks, the description of computer system 500 depicted is intended only as a specific example. Many other configurations having more or fewer components than the system depicted are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary performance in the art will appreciate other ways and/or methods to implement the various embodiments.

As disclosed herein, various embodiments may include one or a combination of the following. The subsystem 101-1 may create and develop a node network of linked content nodes based at least in part on a learning engine matching collected indicia of node specifications to link node specifications to content composites. The subsystem 101-1 may collect, process, organize, and transform collected data portions in order to facilitate mapping the data portions to one or more sets of node specifications that are stored in content storage of node content based at least in part on a modeling/learning engine matching the data portions and/or the consolidated data portions as sharing common, identical, and/or similar data characteristics. The subsystem 101-1 may link different subsets of content nodes in the network of content nodes based at least in part on the node specifications. In various embodiments, node specifications for a particular node may include specifications of objectives, concepts, and/or content composites. The subsystem 101-1 may create graphical representations and visualization data corresponding to portions of the node network that may be exposed to endpoint interfaces. The graphical user interfaces may be adapted as a function of the node specifications and/or endpoint specifications. The subsystem 101-1 may learn patterns of node transition between two or more of the content nodes based at least in part on monitoring endpoint inputs with respect to one or more interfaces exposed for accessing the node network. The subsystem 101-1 may track changes of endpoints with respect to advancement along selected routes between nodes of the node network. Using metrics of interactions, the subsystem 101-1 may perform inter-node analytics and intra-node analytics at least in part to identify attributes of transitional relationships between two or more of the content nodes, and then create node transition metrics based at least in part on the inter-node analytics and the intra-node analytics. The subsystem 101-1 may identify particular target nodes and may model advancement of endpoints from other nodes node mapped to the target nodes based at least in part on the inter-node analytics, the intra-node analytics, and analyzing endpoint specifications. Based at least in part on the computational modeling, the subsystem 101-1 may adapt the node network (e.g., create/modify nodes, node specifications, content composites, transitional relationships between nodes, and/or the like) to influence the advancement and corresponding graphical representations to be exposed via the endpoint interface.

The subsystem 101-1 may create and develop tree data structures that are adapted to particular endpoints. The creation and development of the tree data structure may be a function of one or more identified target nodes, a current node of a particular endpoint, the particular endpoint specifications, and learned patterns of other matching endpoints. Adapted in view of such parameters, the tree data structure may correspond to a particularized view of the node network with indicia particularized to the endpoint, and graphical representations and corresponding visualization data may be created and/or modified by the subsystem 101-1 for presentation via the graphical user interface. Accordingly, the particular endpoint may be provided with an adapted graphical user interface that presents adapted content, indicia, and level of detail. Further still, the subsystem 101-1 may monitor interactions/inputs in real-time or near real-time and, based at least in part on the monitoring and corresponding metrics, further adapt the node network in real-time or near real-time as one or more of the endpoints advanced to the network. Such adaptation may include creating and/or modifying one or a combination of tree data structures, content composites, node specifications, nodes, transitional relationships, the like as a function of one or more particular endpoints, and then creating or otherwise adapting corresponding graphical representations, visualization data, and graphical user interfaces to reflect and surface the changes. Further details regarding disclosed embodiments are provided in U.S. patent application Ser. No. 17/003,956, filed Aug. 26, 2020, and U.S. Provisional Patent Application No. 62/891,824, filed Aug. 26, 2019, each of which applications is hereby incorporated by reference as if fully set forth herein for all purposes.

Figure 6:
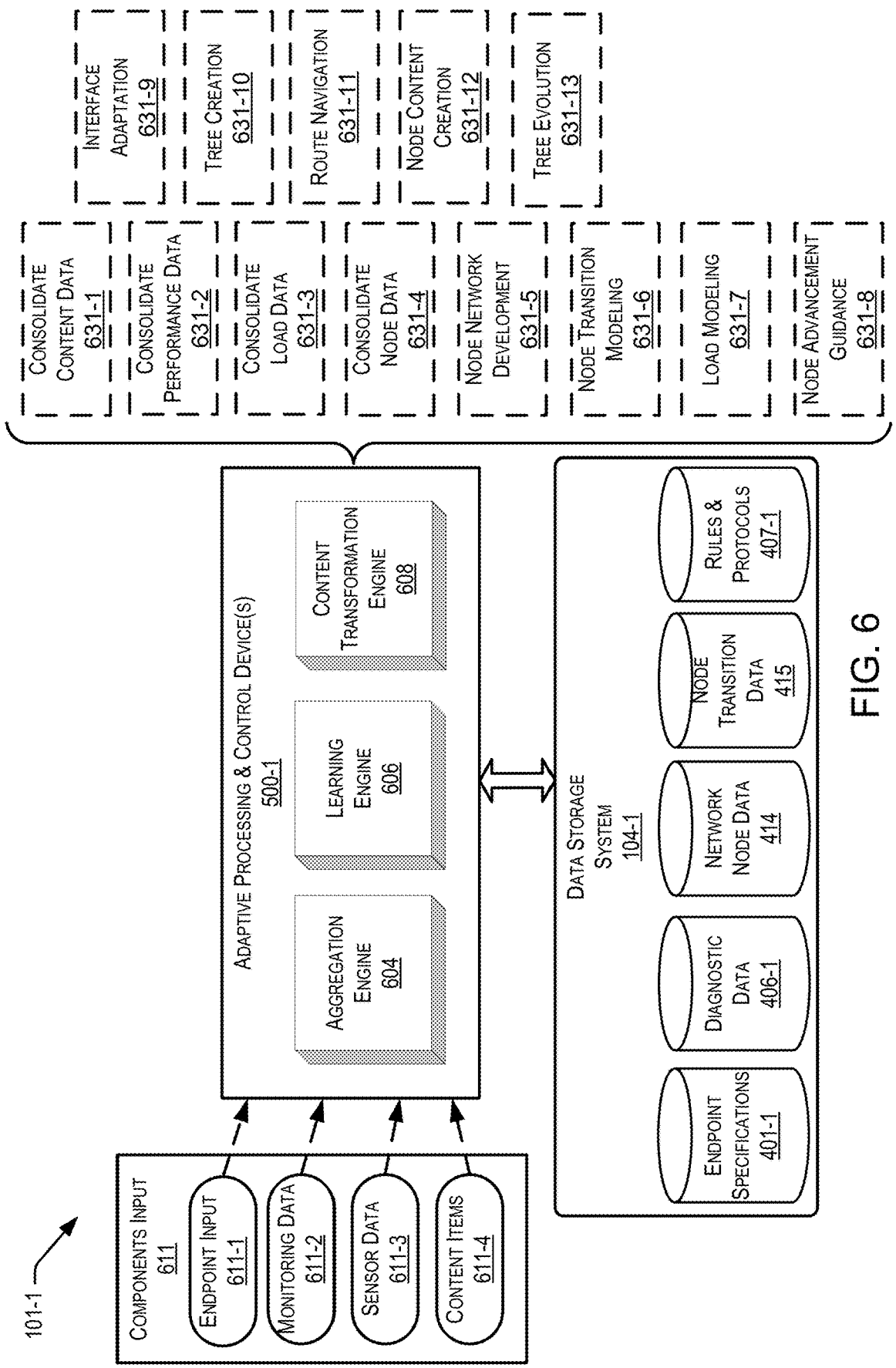
FIG. 6 illustrates a block diagram of aspects of the endpoint adaptation subsystem, in accordance with embodiments of the present disclosure.

FIG. 6 illustrates a diagram of aspects of the endpoint adaptation subsystem 101-1 according to disclosed embodiments of the present disclosure. In some embodiments, the server system 101 may include and be configured to provide the endpoint adaptation subsystem 101-1. While the adaptation subsystem 101-1 is illustrated as being composed of multiple components, it should be understood that the subsystem 100-1 may be broken into a greater number of components or collapsed into fewer components in various embodiments. Each component may include any one or combination of computerized hardware, software, and/or firmware. In various embodiments, the adaptation subsystem 101-1 includes one or more adaptive processing and controlling devices 500-1, which may be implemented with one or a combination of devices 102, 114, 116, 104, 106, 108, and/or 110 in various embodiments. With regards to the adaptive processing devices 500-1, the content management server(s) 102 may include various server hardware and software components that manage the content resources within the content access network 100 and provide interactive and adaptive content to endpoints on various endpoint devices 106. The adaptive processing devices 500-1 may be implemented using dedicated hardware within the content access network 100 (e.g., one or more servers), or using designated hardware and software resources within a shared server (e.g., content management server 102).

The one or more adaptive processing and control devices 500-1 (referenced herein as one or more adaptive processing devices 500-1) may include one or more aggregation engines 604, one or more learning engines 606, and/or one or more content transformation engines 608, which may be separate or integrated in various embodiments. In various embodiments, the adaptive processing and control devices 602 may correspond to a single, integral engine or separate engines working in conjunction. The adaptive processing and control devices 602 may transform, translate, or otherwise adjust data collected. In various embodiments, the adaptive processing and control devices 602 may correspond to executable code stored in one or more memories communicatively coupled with one or more processors, such as those of the subsystem 101-1. In some embodiments, the adaptive processing and control devices 602 may correspond to one or more servers of the server system 101 with one or more of the servers configured to perform one or more of the adaptation and control features in accordance with embodiments disclosed herein.

The subsystem 101-1 may be configured to perform a number of adaptive controls 631 with one or a combination of the training interface, the endpoint devices 106, the administratory devices 110, sensors 209, and/or data sources as disclosed herein. As elaborated herein, the adaptive controls 631 may include consolidating content data 631-1, consolidating performance data 631-2, consolidating load (e.g., endpoint) data 631-3, consolidating network node data 631-4, node network creation and evolution 631-5, node transition modeling 631-6, load modeling 631-7, node advancement guidance 631-8, interface adaptation 631-9, tree creation 631-10, node-specific and route-specific navigational assistance 631-11, node-specific and route-specific content creation 631-12, tree evolution 631-13, and/or the like. By of example and as disclosed herein, the subsystem 101-1 may collect and store content composites and create a configured set of content composites configured according to a computational model that comprises a hierarchical ordering of the set of content composites using a tree data structure and to be presented with a graphical user interface. The subsystem 101-1 may create the tree data structure corresponding to content nodes linked in a network of content nodes. The subsystem 101-1 may create and configure the network of content nodes so that each content node of the network of content nodes includes respective linked content and node specifications. The subsystem 101-1 may transmit the at least part of the configured set of content composites to one or more endpoint devices and cause presentation of at least part of the configured set of content composites with a graphical user interface. The subsystem 101-1 may create a graphical representation formatted to at least partially represent the tree data structure corresponding to the content nodes linked in the network of content nodes, where each represented node of the graphical representation comprises one or more selectable links to access underlying data corresponding to one of the content nodes. The underlying data may include one or both of the respective node specifications and one or more content composites corresponding to the content node. The subsystem 101-1 may transmit visualization data corresponding to the graphical representation to the endpoint device to facilitate the graphical user interface and access to the graphical representation of at least part of the tree data structure. The subsystem 101-1 may determine, using a processing device at the endpoint device 106 and/or at the subsystem 101-1 that monitors user inputs, metrics of user interactions with the at least part of the configured set of content composites when the at least part of the configured set of content composites is presented with the graphical user interface. The subsystem 101-1 may automatically training the computational model using the metrics of user interactions to create an adapted computational model. The subsystem 101-1 may create an adapted set of content composites configured according to the adapted computational model that comprises one or both of a second hierarchical ordering of the adapted set of content composites using a second tree data structure and specifications of one or more content composites that are different from the configured set of content composites. The subsystem 101-1 may transmit at least part of the adapted set of content composites to the one or more endpoint devices 106 and/or a second set of one or more endpoint devices 106 and cause presentation of at least part of the adapted set of content composites the graphical user interface of the user device and/or another graphical user interface.

Figure 7:
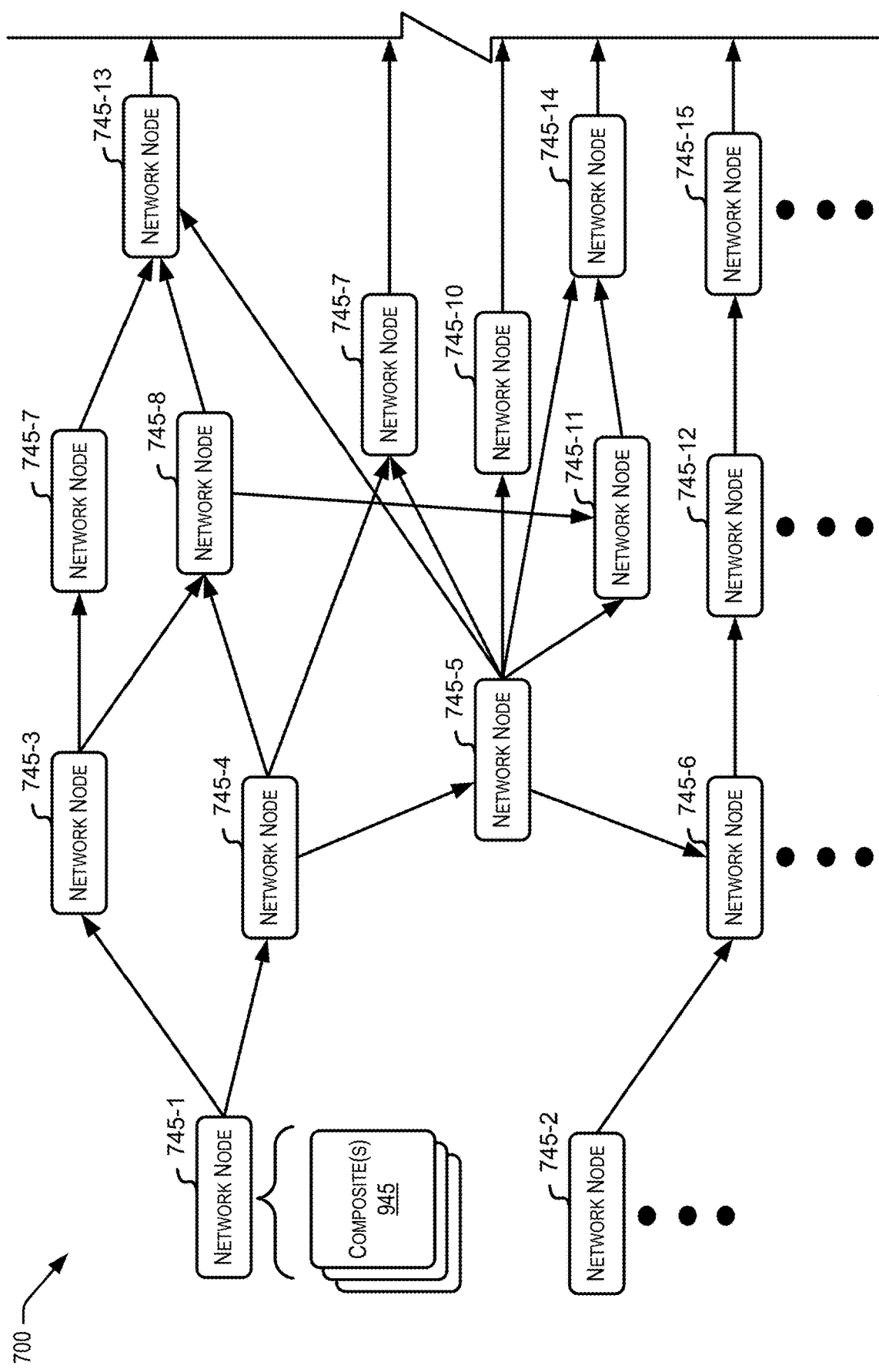
FIG. 7 illustrates a block diagram of a node network, in accordance with embodiments of the present disclosure.

To facilitate the various features disclosed herein, the subsystem 101-1 may create, train, develop, modify, and/or otherwise use a node network. FIG. 7 illustrates a node network 700, in accordance with disclosed embodiments of the present disclosure. Disclosed embodiments of the system 101 may implement adaptive creation and evolution of a network of nodes 700 with a number of adaptation and evolution features disclosed herein. Each node 745 may correspond to one or more content composites 945 mapped to one or a combination of one or more indications of node specifications (e.g., specifications of objectives, concepts, skills, certifications, proficiencies, specialties, tasks, roles, titles, positions, and/or the like which the system learns as to be associated with particular nodes).

The system 101 may harvest data (e.g., components input 611, content items 611-4) to derive and develop indicia of node specifications from the content provider systems and data source systems to learn the different content items 611-4, nodes 745, and corresponding specifications and how to match at least some of the different content items 611-4 and node specifications to one or more network nodes 745, consolidate the node specifications, and use the combined node specifications to create, augment, and/or evolve the network node specifications and content items 611-4 linked to each network node 745. Disclosed embodiments of the system 101 may adaptively map the content composites 945 and the associated node specifications to nodes 745 of the network 700 in order to facilitate other features of the platform. The mapping may include harvesting and cleaning up data from data feeds from multiple sources, matching and consolidating the data to network nodes 745, augmenting the data with other types of data to facilitate other features disclosed herein, and evolving the data nodes 745 over time to adapt to particular endpoints (e.g., particular users). The mapping may provide for normalization and standardized criteria to differentiate indications of node specifications. Thus, although some substantially similar or equivalent indications of node specifications may differ in titles or descriptions, the system 101 may match and link the indications of node specifications to common nodes 745 based at least in part on detecting commonalities in one or a combination of the indications of node specifications.

In some embodiments, the node network may 700 include a plurality of content composites 945 corresponding to nodes 745 of the node network 700, with one or more composites 945 corresponding to each node 745. A node-specific tree data structure may be created for each node 745 to hierarchically order a plurality of content composites corresponding to the node. The hierarchical ordering of the content composites may be specified with a composite index tree the plurality of composites and the ordering thereof by which an endpoint may traverse the plurality of composites when advancing through that particular node 745. In various embodiments, indexing to facilitate tree data structures disclosed herein may be by way of specifications, links, and/or pointers or other references, which may be in an array or index.

In various embodiments, the content composites 945 may include content composite aggregations and node specifications. The content composite aggregation may include a collection/arrangement of content composites including one or more presentation portions that can be provided to an endpoint as in the examples disclosed further herein. The content composite aggregation may include linked and/or combined (eliminating data not useful) data from a plurality of data sources, which data may be used for analysis and other features disclosed herein. Content items 611-4 having data elements with similar or shared characteristics may be stored in one or more composite data structures and linked together in the network of nodes 700.

In some embodiments, each the content composites 945 may correspond to a containerized data structure that may be stored in the data storage system 104-1 and that containerizes the content object aggregations and node specifications with a data structure that can be passed to and ingested by other systems and components. Content composites 945 may be linked to other composites by way of one or a combination of specifications of addressing, links (which may include hyperlinks), and/or pointers or other references. For example, a particular composite 945 may contain specifications, links, and/or pointers or other references, which may be in an array or index, to one or more other content composites 945 in the network 700.

In various embodiments, the node network 700, one or more of the nodes 745, and/or one or more of the linked composites 945 may be exposed via the training interface to endpoint devices 106 as the network of nodes 700 for access/use by the endpoints. The nodes 745 may be accessible in different forms. For example, the network 700 could be presented in graphical form, using user-selectable interface options. The endpoint interface may include any text, image, and/or device that can be displayed on a display screen for providing information to a user and/or for receiving user input, and may include one or more widgets, windows, dashboards, text, text boxes, text fields, tables, grids, charts, hyperlinks, buttons, lists, combo boxes, check-boxes, radio buttons, and/or the like. The selectable interface options, such as hyperlinks, may be provided at each illustrated node 745 in order to access the underlying options, content, and data of the composite 945 at that node 745, including the associated training modules and diagnostics. FIG. 7 may correspond to one example of a possible graphical representation of part of a node network 700. Other examples are possible, such as those in the incorporated by reference provisional applications.

Referring again more particularly to FIG. 6, the one or more adaptive processing devices 500-1 may be communicatively coupled with interface components and communication channels (which may take various forms in various embodiments as disclosed herein) configured to receive components input 611. The components input 611 may include input from a plurality of different data sources. For example, the endpoint adaptation subsystem 101-1 may be configured to retrieve and receive the components input 611 may include endpoint input 611-1, monitoring data 611-2, sensor data 611-3, and/or content 611-4, which may be received and/or retrieved via the network interfaces from one or a combination of the endpoint devices 106, 206, sensors 209, administrative devices 110, servers 108, and/or any other suitable component interfacing with the system 100. By way of further example, content 611-4 may be received and/or retrieved from content provider systems, data source systems, and/or like media devices that may correspond to any suitable sources of data such as one or more computer systems, databases, websites, portals, any repositories of data in any suitable form, server systems, other endpoint devices like endpoint devices 106 but functioning as data sources, and/or the like. The endpoint adaptation subsystem 101-1 may receive and/or retrieve the components input 611 via one or more data acquisition interfaces may include one or more application programming interfaces (APIs) that define protocols and routines for interfacing with the systems of the data sources. The APIs may specify application programming interface (API) calls to/from systems of data sources. In some embodiments, the APIs may include a plug-in to integrate with an application of a source system. The data acquisition interfaces, in some embodiments, could use a number of API translation profiles configured to allow interface with the one or more additional applications of the data sources to access data (e.g., a database or other data store) of the source systems. The API translation profiles may translate the protocols and routines of the source systems to integrate at least temporarily with the system and allow communication with the system by way of API calls. In various embodiments, the components input 611 gathered and/or created data in real-time, near real-time, or along another time line.

Figure 8:
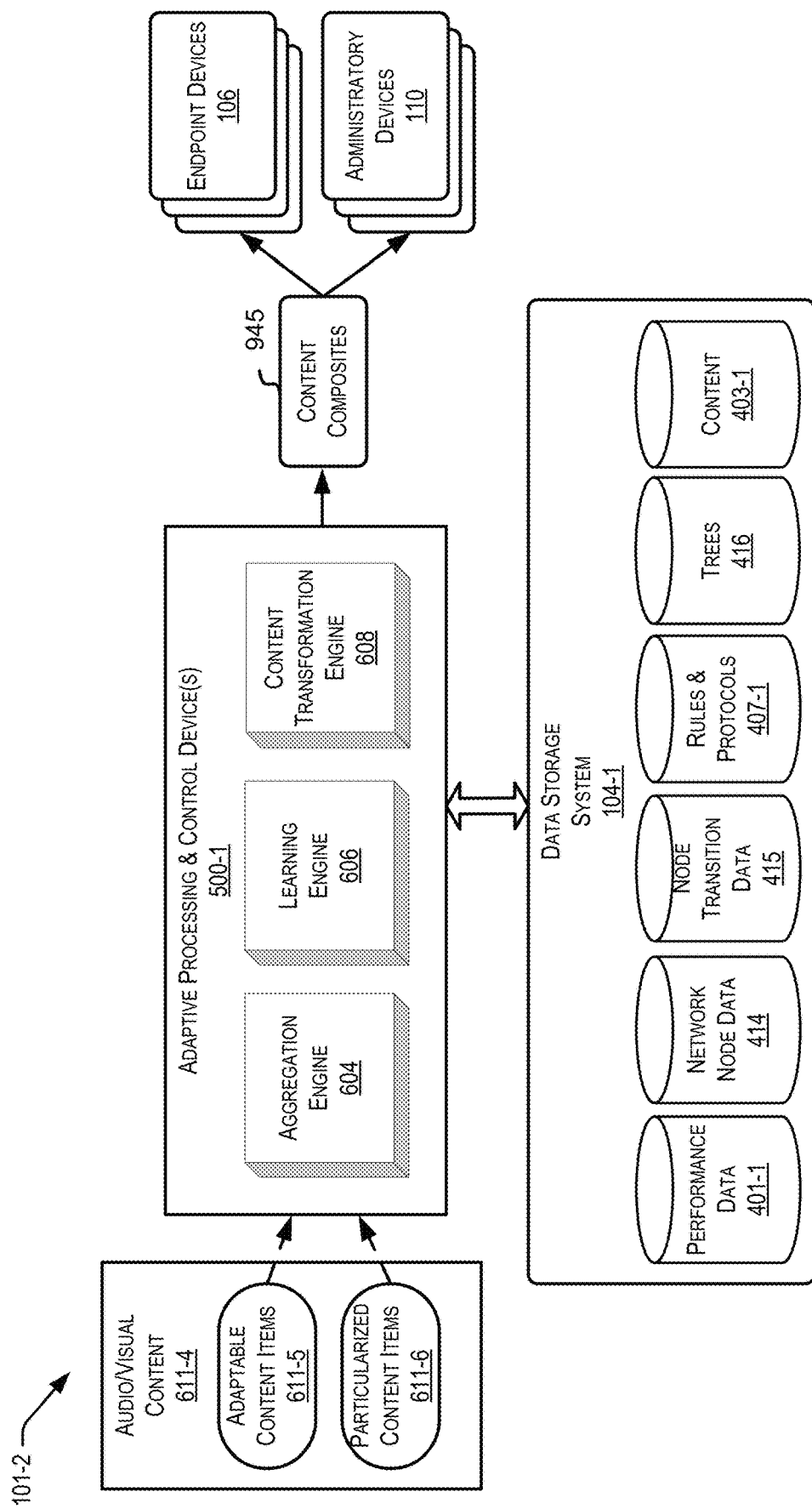
FIG. 8 illustrates a block diagram of aspects of the endpoint adaptation subsystem, in accordance with embodiments of the present disclosure.

FIG. 8 illustrates another diagram of aspects of the endpoint adaptation subsystem 101-1 according to disclosed embodiments of the present disclosure. As indicated, the content 611-4 may include audio and/or visual content, and, in various embodiments, may include adaptable content items 611-5 and particularized content item items 611-6. In various embodiments, sets of one or more adaptable content items 611-5 and/or sets of one or more content item 611-6 may be transmitted to the subsystem 101-1 in batches. For example, sets of one or more adaptable content items 611-5 and/or sets of one or more content items 611-6 may be transmitted to the subsystem 101-1 on a periodic or otherwise scheduled basis. Disclosed embodiments may use the content items 611-5 and particularized content item items 611-6 to provide for endpoint-specific, node-specific, and/or route-specific content composites 945. The system 101 may adapt and present node-specific and route-specific content customized to the individual content automatically, on-demand, or otherwise through an interface. Based at least in part on the analytics disclosed herein, targeted and individualized training plans/content for a particular content may be developed in view of the endpoint's current node 745 and a selected target node 745 and node route.

The endpoint adaptation subsystem 101-1 may aggregate and use the content 611-4, transforming it to create content composites 945 that the endpoint adaptation subsystem 101-1 may transmit to endpoint devices and/or administratory devices 110 (which provisioning may or may not be by way of the proxy server 108). The content transformation engine 608 may include or otherwise correspond to an audiovisual control engine that, as with disclosed embodiments of the other engines, may include instructions retained in processor-readable media and to be executed by one or more processors. In some embodiments, the content transformation engine 608 may control the transmitting of content composites 945 to one or more endpoint devices 106 and/or administrator devices 110. The content transformation engine 608 may cause the endpoint adaptation subsystem 101-1 to transmit the content composites 945 via the communication subsystem 532 to facilitate the various provisioning features disclosed herein.

The content 611-4 may include various components, including without limitation, one or more video tracks, audio tracks, audio video tracks, metadata tracks, close captioning information, text, graphics, and/or the like. The endpoint adaptation subsystem 101-1 may store the content 611-4 in the content storage 403-1. The content may include adaptable content items 611-5 and particularized content objects 611-6. The adaptable content items 611-5 may correspond to audio/visual training content that is directed to certain objectives, concepts, skills, certifications, proficiencies, specialties, proficiency categories, tasks, roles, titles, positions, and/or the like. The adaptable content items 611-5 may be adaptable with the particularized content objects 611-6 to a greater level of particularity and specificity in the training content so that the content may be customized for a particular endpoint as a function of the identified one or more deficiencies of the endpoint with regard to certain endpoint roles, endpoint certifications, processes and/or tasks, proficiency categories, and/or the like. In various embodiments, the adaptable content items 611-5 and/or the content item objects 611-6 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure.

One or a combination of the engines (e.g., aggregation engine 604) may be configured to analyze, classify, categorize, characterize, tag, and/or annotate the content 611-4, the adaptable content items 611-5, and/or the particularized content objects 611-6. The generated metadata (e.g., one or more tags) may correspond to identifiers, attributes, characteristics, and/or categories of the content 611-4, the adaptable content items 611-5, and/or the particularized content objects 611-6. The content 611-4, the adaptable content items 611-5, and/or the particularized content objects 611-6 may be augmented with the metadata and then stored in augmented forms in the content storage 403-1. In some embodiments, the content 611-4, the adaptable content items 611-5, and/or the particularized content objects 611-6 may be packetized and assigned packet identifiers. A particular packet identifier may be associated with data packets related to tags for particular segments of metadata-augmented content 611-4, adaptable content items 611-5, and/or particularized content objects 611-6. Tag data may include an indication of a period of time (or other measure of time, e.g., a number of frames), a start frame, an end frame, and/or the like. Tag data may include or otherwise be associated with one or more tag identifiers and may include attribute and category identifiers such as one or a combination of role, certification, procedure, process, task, device/component, endpoint specification, location, time, and/or the like identifiers.

The metadata for adaptable content items 611-5 may, for example, identify the adaptable content items 611-5 as being adaptable with any suitable identifier, such as a flag, field value, etc. Additionally or alternatively, the metadata for the adaptable content items 611-5 may identify that the adaptable content items 611-5 are designated for one or more certain objectives, concepts, skills, certifications, proficiencies, specialties, proficiency categories, tasks, roles, titles, positions, and/or the like with any suitable identifier. Additionally or alternatively, the metadata for the adaptable content items 611-5 may identify transition points, hooks, frames, windows, other portions designated for overlays, insertion, grafting, and/or the like for merging with content objects 611-6 such that content from the content objects 611-6 is merged at the transition points, hooks, frames, windows, other portions designated for overlays, and/or the like. In various embodiments, the adaptable content items 611-5 may be merged, blended, joined, overlaid, customized, and/or the like in any suitable manner with other content items 611-6, in order to create electronic content composites particularized to certain types of content, modes (audio vs. visual), languages, concepts, training exercises, and/or the like. In various embodiments, as further disclosed herein, the adaptable content items 611-5 and/or the other content items 611-6 may be formatted, rescaled, cropped, image characteristic (e.g., color, brightness, transparency, opaqueness, contrast, etc.) adjusted, and/or otherwise prepared to facilitate the merging, blending, joining, overlaying, customizing, and/or the like and presentation by endpoint media devices 116 as disclosed herein.

As another example, as disclosed herein, adaptable content items 611-5 may be adapted with content objects 611-6 corresponding to particularized audio segments. For instance, the adapting may include selecting an audio segment from a plurality of audio segments and configuring an adaptable content item 611-5 with the selected audio segment so that the resulting content composite plays the selected audio segment for at least part of a first presentation time when the content composite is presented. In various embodiments, the configuring may include adding an audio segment to the adaptable content item 611-5 and/or electronic content composite and/or replacing an audio segment thereof. In various embodiments, replacing an audio segment may include detaching (e.g., dereferencing, unselecting, or otherwise disassociating an audio file from a play command that would cause the audio file to be played along with the playing of the video file of the item/composite), cutting, and/or deleting a previously attached audio track/file from the video file and attaching a different audio track/file to the video file. In various embodiments, the audio segment may be new to, or selected from, the audio segment to the adaptable content item 611-5 and/or electronic content composite. For example, a content composite may include a plurality of audio segments from which one or more audio segments may be selected to play with the video portion of the composite. In various embodiments, the audio segment may be configured to play as an entire audio track commensurate with the presentation time of the video portion and/or to play for only part of the video timeline. In some embodiments, the configuring may include manipulating the file to mix multiple audio segments, to adjust the volumes of the audio segments, to combine audio segments at various volume levels, to fade into and/or out of audio segments, to trim the lengths of the audio segments, to combine audio segments based at least in part on matching waveforms, audio elements, and/or audio characteristics (e.g., tempo, volume, duration) of the audio segments, to adjust the positions the audio segments to particular positions with respect to the video timelines, and/or the like.

In some embodiments, the content transformation engine 608 may include a multiplexer and may be configured to create a digital stream of data packets containing the video and/or audio corresponding to content composites 945. The content composites 945 may be created with one or more of the adaptable content items 611-5 and/or one or more of the particularized content objects 611-6. Sets of one or more adaptable content items 611-5 and/or particularized content objects 611-6 may be selected (e.g., by the learning engine 606 and/or the content transformation engine 608) for designated time periods by way of tag data or other metadata matched to the identified one or more deficiencies and/or requests associated with the resource based at least in part on rules 407-1 which may specify training specifications such as event, role, certification, procedure, process, task, device/component, load specifications, location, time, and/or the like in order to automatically customize training content presentation for particular resources, resource needs, and trigger events. Various sets of rules 407-1 may provide for various types of restrictions and/or specifications on creating and/or provisioning content composites 945 that may be at least partially a function of the training specifications.

The components input 611 may include specifications and other data indicative of content provided to particular endpoints and endpoint devices 106 via the training interface, the extent to which the content is surfaced and progressed through via the endpoint devices 106, input provided by the endpoints and endpoint devices 106 responsive to prompts of the content, endpoint performance levels, content difficulty levels, subsequent content to provision to the endpoints and endpoint devices 106, and/or the like, which may correspond to one or a combination of endpoint input 611-1, monitoring data 611-2, and/or sensor data 611-3. The technical improvements provided by the subsystem 101-1 over prior technologies include improvements in endpoint adaptability, adaptation accuracy, and device/interface control at least in part by machine-intelligent handling of input from the multiple different sources, including the training interface, the endpoint devices 108, administrative devices 110, the sensors 209, and/or content provider and data source systems, in order to adapt to various distinct endpoints and endpoint changes, as is disclosed herein.

Figure 9:
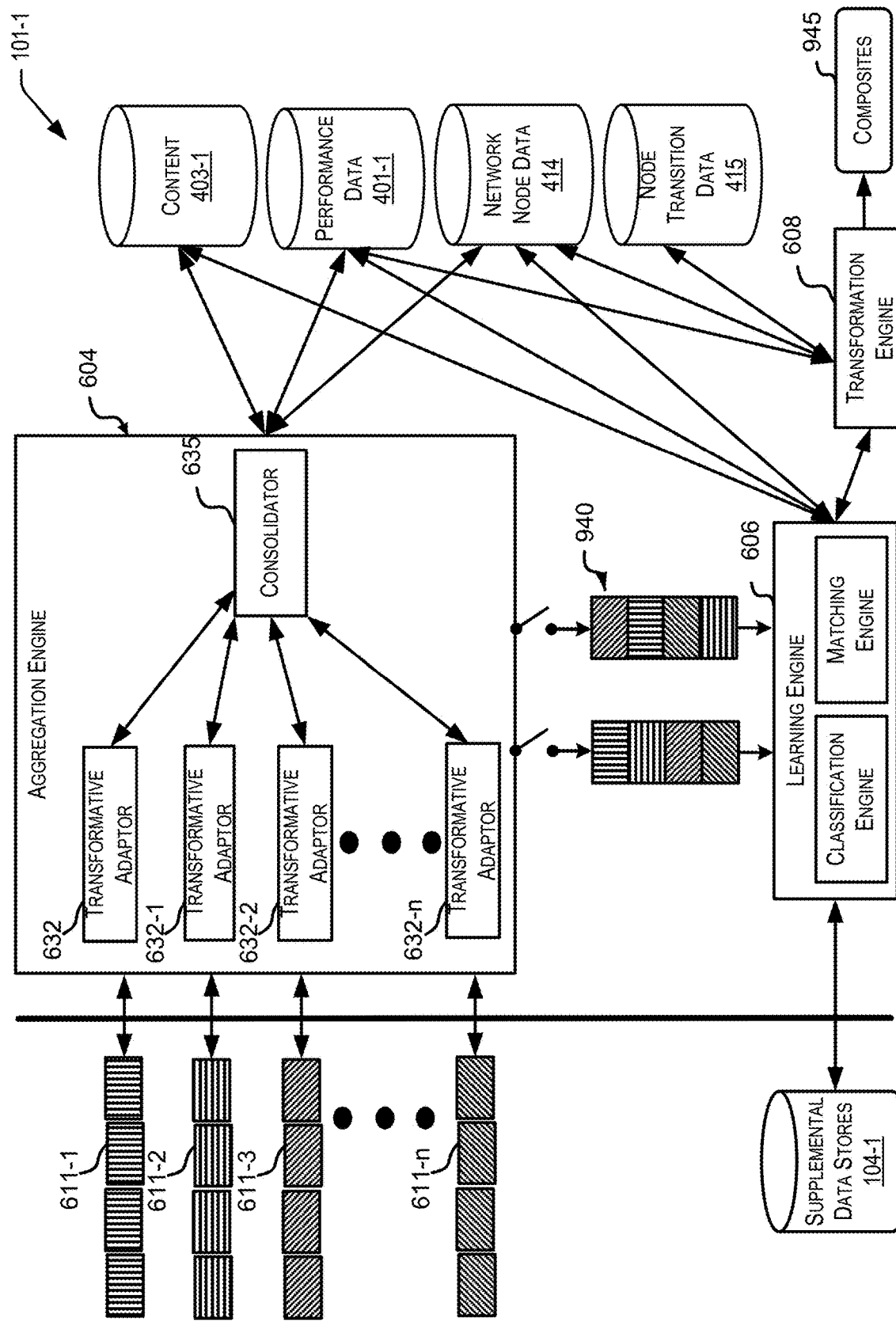
FIG. 9 illustrates a block diagram of aspects of the endpoint adaptation subsystem, in accordance with embodiments of the present disclosure.

FIG. 9 illustrates a diagram that depicts a portion of the endpoint adaptation subsystem 101-1 including further aspects of the aggregation engine 604, learning engine 606, and transformation engine 608 according to disclosed embodiments of the present disclosure. In various embodiments, the engines may correspond to a single, integral engine or separate engines working in conjunction. The aggregation engine 604 may transform, translate, or otherwise adjust data 611 collected.

The aggregation engine 604 may utilize any one or combination of the interfaces disclosed above as one or more content acquisition interfaces configured to allow the aggregation engines 604 to gather data 611 from data sources corresponding to any one or combination of the sources of data indicative of performance data, network node data, content-related data, sensor data, endpoint-related data, location data, and/or the like disclosed herein to facilitate the features disclosed herein. The data 611, which may include multiple data packets and/or data streams, may be received via one or more networks, such as a local area network, a Wi-Fi network, or the Internet, from multiple sources (e.g., from a single premises or multiple premises), such as a component or user device that collects at least some of the data included in each data element based at least in part on inputs detected at the component or user device, measurements made by a sensor, and/or data monitored by a monitoring device, as disclosed herein. In some instances, the data may be collected immediately, or with some delay (e.g., so as to be at an end of a data-collection effort) appended to a data stream or other data packets transmitted directly or indirectly to the engines 604. In some instances, collected data can be locally or remotely stored and subsequently retrieved (e.g., by a same or different device) to append to a stream or other data packets. A managing server may then, at a defined time or upon detecting a defined type of event (e.g., receiving a data request or detecting a threshold size of a data stream), retrieve the stored data and append the data (e.g., in raw or processed form) to a stream or other data packets. Thus, a source of a stream or other data packets may be a single component or user device or an intermediate monitoring device or system that collects data from multiple components, sensors, and/or user devices.

As disclosed herein, metrics of interactions with interface elements corresponding to content composites surfaced with an endpoint interface may be determined. The received data 611 may include individual data elements, which may correspond to data collected with respect to one or a combination of: usage data corresponding to usage of components 106; sensor data corresponding to sensors detecting component usage, contents, content actions, content locations, endpoint states and characteristics, and/or like; and/or input provided by contents via devices 108; data indicating day, time, use type, duration, transitions times, task descriptions, content identifiers, endpoint identifiers, location identifiers, and/or the like; requests to perform one or more processes and tasks; requests for contents to perform one or more processes and tasks; corresponding contents mapped to one or more processes and tasks; corresponding endpoints mapped to one or more processes and tasks; task start times and dates; task completion times and dates; process and task performance statuses; content allocation, statuses, availabilities, node assignments, including assigned roles, titles, positions; endpoint statuses and content assignments; time data corresponding to content availabilities; location data and time data corresponding to locations of contents at particular times; location data and time data corresponding to locations of endpoints at particular times; time data corresponding to endpoint availabilities and needs, endpoint specifications, process and task specifications, and/or the like to facilitate various features of content and/or endpoint disclosed herein. In various embodiments, the data 604 may correspond to any one or combination of raw data, unstructured data, structured data, information, and/or content which may include media content, text, documents, files, instructions, code, executable files, images, video, audio, and/or any other suitable content suitable for embodiments of the present disclosure. In various instances, data from 10, 100, 1,000 or any number of different sources may be merged together with data generated internally, data previously received, data from third parties, etc. In various embodiments, the aggregation/transformation engines 604 and/or the learning engines 606 may identify which data and records are about the same content, network node, endpoint, and/or the like, and may merge attributes from different sources into preliminary composites 940 and particularized composites 945 corresponding to content storage 403-1, performance data 401-1, and/or network node data 414, that can be used by the endpoint adaptation subsystem 101-1 as one or more bases for other controls 631 features disclosed herein.

The learning engine 606 may, for example, learn patterns of commonalities of node specifications, of content specifications, and of which content specifications match which node specifications. With such learning, the learning engine 606 may identify and develop normalization and standardized criteria to differentiate node specifications and differentiate content specifications, which the learning engine 606 may use to map particular node specifications to particular nodes 745 and mapping particular content specifications to particular nodes 745, though some substantially similar or equivalent nodes and contents may differ in titles, descriptions, and/or the like. Tagging schema may be employed to facilitate the learning and modeling. The aggregation engines 604 and/or the learning engines 606 may recognize identifiers of the above aspects from the data 611 by code mapping, keyword recognition, and/or another suitable method of recognition. For example, the aggregation/transformation engines 604 and/or the learning engines 606 may identify keywords and/or codes as distinctive markings, compile them, and correlate them with recognition criteria (e.g., keyword criteria and/or code system) for the purposes of characterizing each set of data 611 and generating correlation results. Such recognition processing may be performed in real time or near real time. The recognition criteria may include keywords identified by any one or combination of words, word stems, phrase, word collection/arrangements, and/or like keyword information. The recognition criteria may include weighting assigned to words, word stems, phrase, word collection/arrangements, and/or the like. For example, a keyword may be assigned a weight according to its significance. Increased word weights may be linked to increasing probability of criticality. The recognition criteria may correspond to one or more keyword schemas that are correlated to various criticalities. The recognition criteria may correspond to any other suitable means of linking, for example, via a code system, that may be used to associate recognized codes to specific criticalities. Thus, for example, each trigger event may be scored (e.g., with numerical expressions) according to any one or combination of the various factors disclosed herein and a weight for each trigger event may be determined as a function of a criticality score assigned to the trigger event and comparison to one or more thresholds corresponding to one or more categories of criticality (e.g., low criticality, medium criticality, high criticality, and/or the like).

Accordingly, with some examples, electronic communications received via a network, and data portions from the electronic communications may be processed using a natural language processing model to identify indicia of inputs in the data portions. The indicia of inputs may be collected and matched as sharing identical and/or similar components. Such indicia to be mapped to one or more node specifications, nodes, and/or corresponding content composites. Such embodiments may include evaluating unstructured data in the collected data portions using a natural language processing model to identify subjective indicators present in the data portions at least in part by mapping of identified words in the data portions to one or more node specifications. Such mapping may correspond to a transformation of the unstructured data to a structured output that is mapped to one or more identifiers of user sentiment and one or more node specifications (and corresponding nodes and/or content composites). A weight value may be assigned to each of the identified subjective indicators based on a respective correspondence of the identified subjective indicators to the node specifications at least partially by evaluating the structured output against a learning model that specifies relevance of the identified subjective indicators to node specifications.

The subsystem 101-2 may, in some embodiments, include a multi-server system that may include specialized data-pulling engines and stream processing engines (e.g., each engine being a server or processing core). According to disclosed embodiments, with data-pulling engines, at least some of the data may be actively gathered and/or pulled from one the or more data sources, for example, by accessing a third party repository and/or by "crawling" various repositories. In some embodiments, the stream processing engine may be specialized so as to include, for example, stream processors and fast memory buses. In some embodiments, subsystem 101-2 may be configured to initiate agents configured to detect electronic communications that may be accessible via the one or more networks (which may include the Internet) to detect user-generated content that may be mapped to one or more particular node specifications. The agents may be specific to communication/message type, destination entity, and/or any other suitable characteristic. An agent may, in various embodiments, correspond to a bot, a web crawler, a web bot, a web spider, a listener, and/or the like, and may conform to ITI-41, HL7 v.2, HL7 v.3, C-CDA, NEMSIS, FHIR, XDs.b, XDR, or other suitable protocols. The agents can be used to detect and evaluate communications based on data included with the communications or otherwise related to the communications.

The electronic communications may include any suitable transfer of data corresponding to the one or more networks. For example, web scraping may be used to determine what roles and skills are gaining attention, losing attention, and are popular in discussion on various web forums and other sources including social media. Accordingly, some embodiments detect indicia of user metrics and node specifications that may correspond to user interaction with interface elements of other data sources accessible via one or more networks (e.g., social media sites, forums, etc.). The types of content scraped may include various different types, such as textual content, close captioning content for audio and/or video content, and/or metadata which may indicate indicia of node specifications, nodes, and content composites. The scraped information can be automatically analyzed for key words and other language processing may be used to automatically determine whether new node specifications and corresponding content composites should be created (which may, for example, correspond to new roles and/or skills), whether node specifications and corresponding content composites should be modified or removed, and/or the like. Such adaptations may be triggered when the metrics of such user inputs are determined by the system to satisfy one or more thresholds. The thresholds may be numerical thresholds for instances of detected references per unit of time, such as frequencies which may be contingent upon the weight associated with the data sources and detected keywords. The number of instances of detected indicia of node specifications may be numerically scored in any suitable manner with triggering thresholds determined by the system. Likewise, in various embodiments the detection of indicia of node specifications and content composites may be gathered from within the network of endpoint devices to which the node network and content composites are exposed. For example, frequency of use of particular content composites may be monitored as user metrics, with such indicia being used to likewise determine whether node specifications, nodes, and/or corresponding content composites should be created, modified, and/or removed.

Data elements of the received data 811 may be separated, for example, within a stream via a particular (or one of multiple particular) characters or strings, or data elements may begin or end with a particular (or one of multiple particular) characters or strings. In some embodiments, the one or more content acquisition interfaces may include one or more APIs that define protocols and routines for interfacing with the data sources via an API interface. The APIs may specify API calls to/from data source systems. In some embodiments, the APIs may include a plug-in to integrate with an application of a data source system. The one or more data acquisition interfaces, in some embodiments, could use a number of API translation profiles configured to allow interface with the one or more additional applications of the data sources to access data (e.g., a database or other data store) of the data sources. The API translation profiles may translate the protocols and routines of the data source system to integrate at least temporarily with the system and allow communication with the system by way of API calls.

In some embodiments, the data 611 acquired may be in different formats, according to different data standards, in different document structures, including different types of data, etc. The data 611 can then be transformed, translated, or otherwise adjusted by the engines 604. For example, acquired data may be converted from a first format to a second format using one or more conversion rules, which may be user-defined, heuristic, and/or machine-learned. In some embodiments, the engines 604 may perform similar operations with respect to other data generated by elements of the architecture.

In some embodiments, the aggregation and/or transformation engines 604 may include one or more transformative adaptors 632. In some embodiments, one or more transformative adaptors 632 may be associated with the content acquisition interfaces to effect the transformations. The transformative adaptors 632 may be implemented, in various embodiments, in hardware and/or software. In some embodiments, a transformative adaptor 632 may include a hardware device and/or software component that transforms, translates, converts, or otherwise adjusts the acquired data 611.

In some embodiments, various processors and/or layers within the endpoint adaptation subsystem 101-1 can be specialized to perform various types of processes. For example, a first set of processors may be configured to transform the data 611 within a stream in real-time (e.g., to produce data in a standard format and/or one that corresponds to an alert, notification, and/or report protocol) and detect (e.g., based at least in part on data included in a header of a data element) whether the transformed data includes one or more particular types of data. In various embodiments, the first set of processors may utilize the transformative adaptors 632 to effect the transformation and/or may further transform the data beyond first-stage transformations by the transformative adaptors 632.

The aggregation engines 604 may process manifold data sets that may, for instance, come from different sources or the same source, for example, by way of one or more updates to data previously provided by a particular source. The consolidator 635 may consolidate the data sets to form a preliminary composite 940, which may include applying one or more filtering techniques (or one or more filters) to the data sets, organizing, categorizing, qualifying, and/or comparing the sets of information; detecting, identifying, and/or handling errors/discrepancies; identifying redundancies; removing redundancies; discarding data irrelevant to composite package building for particular contents, endpoints, and operations corresponding to content storage 403-1, performance data 401-1, and/or node network data 414; and/or otherwise processing the data sets. The consolidator 635 may determine whether each element includes a data pattern that may be consistent with one or more defined protocols. Such a protocol may define a data pattern as one that includes, for example, one or more particular data elements and/or types of data elements. The consolidator 635 may identify one or more applicable protocols (e.g., based at least in part on source identifier, metadata, a current time, a stream identifier, etc.).

The consolidation and/or modeling may be performed upon detection of one or more events, which may correspond to detection of one or more particular data elements 611, one or more device interaction, and/or data changes that correspond to a defined event. For example, the data 611 may indicate that one or more process tasks are completed by one or more contents. The aggregation/transformation engine 604 may process the data 611 for consolidation as process tasks are completed by one or more contents, and the learning engine 606 may model content process performance as process tasks are completed by one or more contents. Consequent to the aggregation and transformation engine 604 collecting, consolidating, and transforming the data 604 as disclosed herein, the learning engine 606 may model the corresponding performance data with respect to the particular content and/or set of contents to which the one or more process tasks pertain for the one or more particular network nodes mapped to the particular content and/or contents of the set of contents.

As another example, the data 611 may indicate one or more changes in content allocations, statuses, availabilities, node assignments, including assigned roles, titles, positions, units, locations, and facilities. The aggregation/transformation engine 604 may process the data 611 for consolidation as changes are detected, and the learning engine 606 may model content profile data, network node data, and/or node transition data as the changes are detected. Consequent to the collecting, consolidating, and transforming the data 604, the learning engine 606 may model the corresponding node data and/or node transition data for the one or more particular network nodes corresponding to the particular one or more changes detected which may be mapped to the particular content and/or contents of the set of contents. Hence, such modeling may include development of the node transition data to learn node transition patterns.

One or more first-stage processors of the engines 604, which may correspond to the consolidator 635, may form one or more preliminary composites 940 from combined (eliminating data not useful) data. The one or more first-stage processors may transmit the one or more preliminary composites 940 (or replicated versions thereof) to one or more second-stage processors, which may correspond to the learning engine(s) 606. The learning engine 606 may include or otherwise correspond to a learning engine that may employ an ongoing learning mode to create, confirm, correct, and/or refine content storage 403-1, performance data 401-1, network node data 414, and/or node transition data 415. The learning engine 606 may be an analysis and matching engine that employs machine learning to process the components input 611 (e.g., endpoint input 611-1, monitoring data 611-2, and/or sensor data 611-3) and derive the particularized content storage 403-1, performance data 401-1, network node data 414, and/or node transition data 415. The learning engine 606 may be configured to perform any one or combination of features directed to matching or otherwise correlating endpoint input 611-1, monitoring data 611-2, and/or sensor data 611-3.

For example, the learning engine(s) 606 may be configured as a composite builder that may build particularized composite packages 945 corresponding to content storage 403-1, performance data 401-1, network node data 414, and/or node transition data 415. Further, in some embodiments, the learning engine 606 may include a classification engine and a matching engine configured to facilitate classifying and matching features disclosed herein. The learning engine 606 may be configured to perform extraction, apply a rule to process the extracted data element, request, and/or retrieve supplemental data from a remote data source, and/or develop composite packages 945 corresponding to content storage 403-1, performance data 401-1, network node data 414, and/or node transition data 415 with the supplemental data. For example, the learning engine 606 may compare detected, aggregated, combined (eliminating data not useful), and differentiated process performance data (which may include, for example, time-stamped recorded data stored by the subsystem 101-1) with endpoint record data.

The learning engine 606 may pull from the data stores stored content storage 403-1, performance data 401-1, network node data 414, and/or node transition data 415, previously created, to update the stored profiles based at least in part on data 604 newly received and processed. The learning engine 606 may pull from the data stores data pertinent to the content storage 403-1, performance data 401-1, network node data 414, and/or node transition data 415 to supplement with data 604 newly received and processed in order to create and/or update the content storage 403-1, performance data 401-1, network node data 414, and/or node transition data 415. The learning engine 606 may update one or more of the manifold composite packages 945 corresponding to content storage 403-1, performance data 401-1, network node data 414, and/or node transition data 415, in real time, periodically, or when triggered by certain events with respect to the particular contents.

The learning engine 606 may transform the preliminary composites 940 into understandable data, information, and/or content so that the content storage 403-1, performance data 401-1, network node data 414, and/or node transition data 415 contain the transformed data for surfacing to one or more end users via one or more client devices 108 via the endpoint interface. For example, linked composites 945 may be exposed via the endpoint interface to users as the network of nodes 700 for user access/use. The learning engine 606 and/or the transformation engine 608 may identify rules for alerts, notifications, and/or reports. The various rules may include one or more general conditions, such as ones that specify for which content, type of content, node, type of node, type of endpoint, time periods, premises, locations, data sources, and/or client devices for which the rules are to apply. The various rules may include a flag definition that may specify what types of data indicate that information corresponding to a data element is to be reported. For example, a flag definition may include an identification of each of one or more composites 945 and/or one or more values associated with each of the one or more composites 945. The one or more values may include, for example, a numeric, textual or categorical value. The one or more values may include a threshold and/or define a bound for a closed or open range. Thus, for example, a corresponding value included in a data element may be determined to be consistent with the one or more values if it may be within a range (or outside the range—depending on how the protocol may be defined) or exceeds the threshold in a particular direction (e.g., may be above or may be below the threshold). As another example, a corresponding value included in a data element may be determined to be consistent with the one or more values if it may be the same as one (or all) of the one or more values.

The aggregation and transformation engine 604 and/or the learning engine 606 may include a reasoning module to make logical inferences from a set of the detected and differentiated data to infer one or more patterns corresponding to the content storage 403-1, performance data 401-1, network node data 414, and/or node transition data 415. For instance, the pattern data may include information about node histories and any one or combination of corresponding identification histories, action and performance histories, location histories, content allocation histories, and/or the like, any set of which may be used to derive one or more patterns of node data, which may include patterns of node transitions and node metrics, and corresponding patterns of proficiency data, which may include performance data for particular endpoints and sets of endpoints mapped to the network nodes. A pattern-based reasoner may be employed to use various statistical techniques in analyzing the data, both current and historical, in order to infer particularized pattern data from the data 611 and preliminary composites 940. A transitive reasoner may be employed to infer relationships from a set of relationships to form the node data, node transition data, and performance data. In various embodiments, the system automatically establishes and develops the particularized pattern data. In some embodiments, the learning engine 606 may be configured to employ deep learning to process the data and derive the particularized pattern data corresponding to the content storage 403-1, performance data 401-1, network node data 414, and/or node transition data 415. Accordingly, the learning engine 606 may facilitate machine learning or, more specifically, deep learning, to facilitate creation, development, and/or use of particularized pattern data that may include node metrics, node transition metrics, and proficiency metrics, which may include performance metrics.

The node transition specifications and/or metrics may include specifications of which subsets of the nodes 745 may be linked together in the node network 700. For example, only some of the nodes 745 may be directly linked together. Some of the nodes 745 may be indirectly linked together by way of one or more intermediate nodes 745. Some of the nodes 745 may not be indirectly linked. As part of the development of node transition data 415, the learning algorithms of the learning engine 606 may identify from the data 611 all node transition routes taken by endpoints and store corresponding node transition metrics with values, descriptors, flags, identifiers, and/or the like indicative of the node transition routes and corresponding endpoint specifications of the endpoints mapped to the node transition routes. On an ongoing basis, the learning engine 606 may continue to develop the node transition metrics of at least some of the node transition routes as more data 611 indicates more instances of the node transition routes being taken.

With the tracking of endpoint advancement, the learning engine 606 may rank the node transition routes according to various node transition metrics. For example, the node transition routes may be ranked according to numbers of instances of the individual routes being taken. Accordingly, the node transition routes may be scored as a function of the numbers of instances and such scoring may indicate the most common node transition routes taken between two or more nodes, the least common, and various categories in between. The node transition metrics may be augmented to include the rankings, scores, and associated categories. Additionally or alternatively, the learning engine 606 may rank the node transition routes according to numbers of interim nodes. For example, the node transition routes may be ranked according to numbers of interim nodes in the individual routes being taken before advancing to the ultimate nodes of the node transition routes. Accordingly, the node transition routes may be scored as a function of numbers of interim nodes and such scoring may indicate the shortest node transition routes taken between two or more nodes, the longest, and various categories in between. Again, the node transition metrics may be augmented to include the rankings, scores, and associated categories.

Additionally, with the mapping of endpoint specifications to the node transition routes, the learning engine 606 may rank the node transition routes according to any one or combination of types of endpoint specifications disclosed herein. For example, the node transition routes may be ranked according to qualification and/or experience specifications and/or metrics mapped to endpoints at each node along the node transition routes before the endpoints advanced to a next node along the node transition routes. Accordingly, the node transition routes may be scored as a function of such factors and such scoring may indicate how influential the factors are with respect to advancing between two or more nodes along the node transition routes taken. The node transition metrics may be augmented to include the rankings, scores, and associated categories. As a more specific example, the learning engine 606 may rank the node transition routes according to transition speed. For example, the node transition routes may be ranked according to times that endpoints spent at each node along the node transition routes before advancing to the ultimate nodes of the node transition routes. Accordingly, the node transition routes may be scored as a function of transition speeds and such scoring may indicate the fastest node transition routes taken between two or more nodes, the slowest, and various categories in between.

Further, with the mapping of endpoint specifications to the node transition routes, the learning engine 606 may rank the node transition routes according to any one or combination of types of proficiency metrics disclosed herein, which may include performance metrics. For example, the node transition routes may be ranked according to proficiency metrics mapped to endpoints at each node along the node transition routes before the endpoints advanced to a next node along the node transition routes. Accordingly, the node transition routes may be scored as a function of proficiency metrics and such scoring may indicate how influential the proficiency metrics are with respect to advancing between two or more nodes along the node transition routes taken. The node transition metrics may be augmented to include the rankings, scores, and associated categories.

For each node transition, the learning engine 606 may utilize the rankings, scores, and categorization of each node transition metric to determine the most significant subset of node transition metrics for the particular node transition. The learning engine 606 may assign weights to the node transition metrics according to each metric's significance. Such metrics, scores, rankings, and/or weights could be implemented in any suitable manner, including lists, tables, matrices, and/or the like. The node transition metrics could be organized in a rank order and/or any hierarchical structure according to weight. Various embodiments may have node transition metrics organized according to decision tree, with contingencies so that only certain combinations of node transition metrics may be considered. For example, certain node transition metrics could only have significance if in conjunction with and/or subsequent to other node transition metrics, which may correspond to prerequisite node transition metrics. Thus, some node transition metrics may be determined to be necessities for a particular node transition (e.g., a qualification metric such as a certification, particular training, etc., which may satisfy a particular metric threshold, and required in 100% of the node transition instances), while other node transition metrics may be determined to be predominantly influential (e.g., an experience metric or a character metric/specification, which may satisfy a particular metric threshold, and may be observed in high percentile, say, 70%, of the node transition instances) or influential to a lesser extent (e.g., observed in various lower percentiles of the node transition instances) and associated with any suitable category.

Accordingly, disclosed embodiments may further provide for inter-node path analytics and intra-node analytics. Based at least in part on such analytics, an endpoint-specific and/or route-specific tree data structure may be created for each route that is identified for a particular endpoint in order to hierarchically order a plurality of nodes 745 and corresponding composites 945 as a function of the identified route and endpoint. The hierarchical ordering of the plurality of nodes 745 and corresponding composites 945 may be specified with a composite index tree the plurality of composites and the ordering thereof by which an endpoint may traverse the plurality of nodes 745 and corresponding composites 945. Such tree data structures may facilitate the creation of graphical representations and visualization data to indicate particular inter-node and intra-node paths via the endpoint interface. In some embodiments, graphical representations of the tree data structures developed as a function of the endpoint may be created and surfaced via the endpoint interface. Further, as disclosed herein, the subsystem 111-1 may modify particular composites 945 and/or routes as a function of metrics (e.g., performance metrics) of a particular endpoint and/or of a set of endpoints having similar characteristics. With such adaptations, a new tree data structure may be created or a previous tree data structure may be modified as a result of the modifications to the particular composites 945 and/or routes.

Disclosed embodiments may provide for node advancement modeling and guidance for individual endpoints. Based at least in part on the node path and intra-node analytics, the system 101 may provide node advancement modeling and guidance for individual endpoints based at least in part on the current endpoints models and profiles, as well as endpoint input. As disclosed herein, the system 101 may detect that a particular endpoint corresponds to a particular node as the endpoint's current node. The system 101 may expose the system-determined current node for the endpoint via the endpoint interface with one or more user-selectable options for the endpoint to confirm or modify the identification of the current node. Alternatively, the endpoint may self-identify the endpoint's current node via one or more user-selectable options of the interface. An endpoint can further select one or more nodes 745 as target nodes via user-selectable options of the endpoint interface, and the system 101 may analyze the endpoint's profile to determine a number of assessments and recommendations for the endpoint with respect to the one or more target nodes.

Specific details are given in the above description to provide a thorough understanding of the embodiments. However, it may be understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it may be noted that the embodiments can be described as a process which may be depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process may be terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary processes can be stored in a machine readable medium such as a storage medium.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and may be not to be limited to any particular type of memory or number of memories, or type of media upon which memory may be stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but may be not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it may be to be clearly understood that this description may be made only by way of example and not as limitation on the scope of the disclosure.

What is claimed:

1. A system to facilitate adaptive processing and content control, the system comprising:
   one or more processing devices; and
   memory readable by the one or more processing devices and having stored therein processor-readable instructions which, when executed by the one or more processing devices, cause the one or more processing devices to perform operations comprising:
      collecting content composites in a data storage, where:
         each content composite comprises audio and/or visual content; and
         the collecting comprises:
            one or both of receiving one or more content composites via a network interface and creating one or more content composites, and
            storing the one or more content composites in the data storage;
      based at least in part on the content composites, creating a configured set of content composites configured according to a computational model that comprises a hierarchical ordering of the set of content composites using a hierarchical data structure and to be presented with a graphical user interface;
      causing presentation of at least part of the configured set of content composites with a graphical user interface of an endpoint device;
      determining, using a processing device that monitors inputs, metrics of interactions with interface elements corresponding to the at least part of the configured set of content composites surfaced with the graphical user interface;
      automatically training the computational model using the metrics of interactions to create an adapted computational model;
      determining one or more baselines based at least in part on pattern recognition of previous metrics of interactions mapped to the at least part of the configured set of content composites;
      determining one or more variances based at least in part on pattern recognition of the metrics of interactions mapped to the at least part of the configured set of content composite with respect to at least one baseline of normality of the one or more baselines of normality;
      creating an adapted set of content composites configured according to the adapted computational model that comprises one or both of a second hierarchical ordering of the adapted set of content composites using a second hierarchical data structure and specifications of one or more content composites that are different from the configured set of content composites, where the adapted set of content composites is based at least in part on the one or more variances; and
causing presentation of at least part of the adapted set of content composites with one or both of the graphical user interface of the endpoint device and a second graphical user interface of a second endpoint device.

2. The system to facilitate adaptive processing and content control as recited in claim 1, where the determining the metrics of interactions is based at least in part on:
collecting electronic communications received via a network, the electronic communications comprising data portions from a plurality of electronic devices;
processing the data portions to identify indicia of usage of one or more of the content composites; and
mapping at least a subset of the indicia to one or more specifications of one or more nodes in a network of nodes.

3. The system to facilitate adaptive processing and content control as recited in claim 1, where the determining the metrics of interactions is based at least in part on:
collecting electronic communications received via a network, the electronic communications comprising data portions from a plurality of electronic devices;
processing the data portions using a natural language processing model to identify indicia of inputs in the data portions;
collecting the indicia of inputs and matching at least a subset of the indicia of inputs as sharing identical and/or similar components; and
mapping at least the subset of the indicia of inputs to one or more specifications of one or more nodes in a network of nodes.

4. The system to facilitate adaptive processing and content control as recited in claim 1, the operations further comprising:
modifying a network data structure of nodes linked in a network of nodes, the network of nodes configured so that each node of the network of nodes comprises respective linked content, the respective linked content comprising node specifications corresponding to at least part of the adapted set of content composites.

5. The system to facilitate adaptive processing and content control as recited in claim 4, the operations further comprising:
creating a graphical representation formatted to at least partially represent the network data structure of nodes linked in the network of nodes, where each represented node of the graphical representation comprises one or more selectable links to access underlying data corresponding to one of the nodes.

6. The system to facilitate adaptive processing and content control as recited in claim 5, the operations further comprising:
causing presentation of visualization data corresponding to the graphical representation to the endpoint device to facilitate the graphical user interface and access to the graphical representation of at least part of the network data structure.

7. The system to facilitate adaptive processing and content control as recited in claim 6, where the underlying data comprises one or both of the respective node specifications and one or more content composites corresponding to the node.

8. A method to facilitate adaptive processing and content control, the method comprising:
collecting content composites in a data storage, where:
each content composite comprises audio and/or visual content; and
the collecting comprises:
one or both of receiving one or more content composites via a network interface and creating one or more content composites, and
storing the one or more content composites in the data storage;
based at least in part on the content composites, creating a configured set of content composites configured according to a computational model that comprises a hierarchical ordering of the set of content composites using a hierarchical data structure and to be presented with a graphical user interface;
causing presentation of at least part of the configured set of content composites with a graphical user interface of an endpoint device;
determining, using a processing device that monitors inputs, metrics of interactions with interface elements corresponding to the at least part of the configured set of content composites surfaced with the graphical user interface;
automatically training the computational model using the metrics of interactions to create an adapted computational model;
determining one or more baselines based at least in part on pattern recognition of previous metrics of interactions mapped to the at least part of the configured set of content composites;
determining one or more variances based at least in part on pattern recognition of the metrics of interactions mapped to the at least part of the configured set of content composite with respect to at least one baseline of normality of the one or more baselines of normality;
creating an adapted set of content composites configured according to the adapted computational model that comprises one or both of a second hierarchical ordering of the adapted set of content composites using a second hierarchical data structure and specifications of one or more content composites that are different from the configured set of content composites, where the adapted set of content composites is based at least in part on the one or more variances; and
causing presentation of at least part of the adapted set of content composites with one or both of the graphical user interface of the endpoint device and a second graphical user interface of a second endpoint device.

9. The method to facilitate adaptive processing and content control as recited in claim 8, where the determining the metrics of interactions is based at least in part on:
collecting electronic communications received via a network, the electronic communications comprising data portions from a plurality of electronic devices;
processing the data portions to identify indicia of usage of one or more of the content composites; and
mapping at least a subset of the indicia to one or more specifications of one or more nodes in a network of nodes.

10. The method to facilitate adaptive processing and content control as recited in claim 8, where the determining the metrics of interactions is based at least in part on:
collecting electronic communications received via a network, the electronic communications comprising data portions from a plurality of electronic devices;

processing the data portions using a natural language processing model to identify indicia of inputs in the data portions;

collecting the indicia of inputs and matching at least a subset of the indicia of inputs as sharing identical and/or similar components; and mapping at least the subset of the indicia of inputs to one or more specifications of one or more nodes in a network of nodes.

11. The method to facilitate adaptive processing and content control as recited in claim 8, the method further comprising:

modifying a network data structure of nodes linked in a network of nodes, the network of nodes configured so that each node of the network of nodes comprises respective linked content, the respective linked content comprising node specifications corresponding to at least part of the adapted set of content composites.

12. The method to facilitate adaptive processing and content control as recited in claim 11, the method further comprising:

creating a graphical representation formatted to at least partially represent the network data structure of nodes linked in the network of nodes, where each represented node of the graphical representation comprises one or more selectable links to access underlying data corresponding to one of the nodes.

13. The method to facilitate adaptive processing and content control as recited in claim 12, the method further comprising:

causing presentation of visualization data corresponding to the graphical representation to the endpoint device to facilitate the graphical user interface and access to the graphical representation of at least part of the network data structure.

14. The method to facilitate adaptive processing and content control as recited in claim 13, where the underlying data comprises one or both of the respective node specifications and one or more content composites corresponding to the node.

15. One or more non-transitory, machine-readable media having machine-readable instructions thereon which, when executed by one or more processing devices, cause the one or more processing devices to perform operations comprising:

collecting content composites in a data storage, where:
each content composite comprises audio and/or visual content; and
the collecting comprises:
one or both of receiving one or more content composites via a network interface and creating one or more content composites, and
storing the one or more content composites in the data storage;

based at least in part on the content composites, creating a configured set of content composites configured according to a computational model that comprises a hierarchical ordering of the set of content composites using a hierarchical data structure and to be presented with a graphical user interface;

causing presentation of at least part of the configured set of content composites with a graphical user interface of an endpoint device;

determining, using a processing device that monitors inputs, metrics of interactions with interface elements corresponding to the at least part of the configured set of content composites surfaced with the graphical user interface;

automatically training the computational model using the metrics of interactions to create an adapted computational model;

determining one or more baselines based at least in part on pattern recognition of previous metrics of interactions mapped to the at least part of the configured set of content composites;

determining one or more variances based at least in part on pattern recognition of the metrics of interactions mapped to the at least part of the configured set of content composite with respect to at least one baseline of normality of the one or more baselines of normality;

creating an adapted set of content composites configured according to the adapted computational model that comprises one or both of a second hierarchical ordering of the adapted set of content composites using a second hierarchical data structure and specifications of one or more content composites that are different from the configured set of content composites, where the adapted set of content composites is based at least in part on the one or more variances; and causing presentation of at least part of the adapted set of content composites with one or both of the graphical user interface of the endpoint device and a second graphical user interface of a second endpoint device.

16. The one or more non-transitory, machine-readable media as recited in claim 15, where the determining the metrics of interactions is based at least in part on:

collecting electronic communications received via a network, the electronic communications comprising data portions from a plurality of electronic devices;

processing the data portions to identify indicia of usage of one or more of the content composites; and mapping at least a subset of the indicia to one or more specifications of one or more nodes in a network of nodes.

17. The one or more non-transitory, machine-readable media as recited in claim 15, where the determining the metrics of interactions is based at least in part on:

collecting electronic communications received via a network, the electronic communications comprising data portions from a plurality of electronic devices;

processing the data portions using a natural language processing model to identify indicia of inputs in the data portions;

collecting the indicia of inputs and matching at least a subset of the indicia of inputs as sharing identical and/or similar components; and mapping at least the subset of the indicia of inputs to one or more specifications of one or more nodes in a network of nodes.

\* \* \* \* \*